(12) United States Patent
Baarman

(10) Patent No.: US 9,054,542 B2
(45) Date of Patent: Jun. 9, 2015

(54) COIL CONFIGURATIONS FOR INDUCTIVE POWER TRANSFER

(75) Inventor: David W. Baarman, Fennville, MI (US)

(73) Assignee: Access Business Group International LLC, Ada, MI (US)

( * ) Notice: Subject to any disclaimer, the term of this patent is extended or adjusted under 35 U.S.C. 154(b) by 1020 days.

(21) Appl. No.: 13/156,390

(22) Filed: Jun. 9, 2011

(65) Prior Publication Data

US 2011/0304216 A1 Dec. 15, 2011

Related U.S. Application Data

(60) Provisional application No. 61/353,522, filed on Jun. 10, 2010, provisional application No. 61/492,963, filed on Jun. 3, 2011.

(51) Int. Cl.
| | |
|---|---|
| H01F 27/42 | (2006.01) |
| H01F 37/00 | (2006.01) |
| H01F 38/00 | (2006.01) |
| H02J 5/00 | (2006.01) |
| H02J 17/00 | (2006.01) |

(52) U.S. Cl.
CPC ........ *H02J 5/005* (2013.01); *H02J 17/00* (2013.01)

(58) Field of Classification Search
CPC .......... H01F 38/14; H01F 27/28; H02J 7/025; H02J 5/005; H02J 17/00
USPC ....................................................... 307/104
See application file for complete search history.

(56) References Cited

U.S. PATENT DOCUMENTS

| | | | |
|---|---|---|---|
| 645,576 | A | 3/1900 | Telsa |
| 685,012 | A | 10/1901 | Tesla |
| 4,837,556 | A | 6/1989 | Matsushita et al. |
| 5,528,113 | A | 6/1996 | Boys et al. |

(Continued)

FOREIGN PATENT DOCUMENTS

| | | |
|---|---|---|
| DE | 10 2008 056 927 | 6/2009 |
| EP | 2211438 | 7/2010 |

(Continued)

OTHER PUBLICATIONS

PCT International Search Report for Application No. PCT/US2011/039725 mailed on Aug. 27, 2012.

(Continued)

*Primary Examiner* — Carlos Amaya
(74) *Attorney, Agent, or Firm* — Warner Norcross & Judd LLP

(57) ABSTRACT

An inductive power supply system in which the receiving unit includes a secondary coil and a plurality of resonating circuits with different characteristics. Each of the resonating circuits may include a resonating coil and a resonating capacitor. The resonating coils may be inductively coupled to the secondary coil so that energy may be transferred from one or more of the resonating coils to said receiving unit. The plurality of resonating circuits are configured to provide improved power transfer efficiency or performance at different distances between the primary coil and secondary coil. The present invention may also provide a method for tuning the wireless power system including the general steps of measuring an operating characteristic in the primary unit, measuring an operating characteristic in the receiver unit and tuning one or more of the components in the primary unit and the secondary unit based on a comparison of the two measurements.

16 Claims, 19 Drawing Sheets

(56) References Cited

U.S. PATENT DOCUMENTS

| | | |
|---|---|---|
| 6,917,182 B2 | 7/2005 | Burton et al. |
| 7,385,357 B2 | 6/2008 | Kuennen et al. |
| 7,675,197 B2 | 3/2010 | Tetlow |
| 7,953,369 B2 | 5/2011 | Baarman |
| 8,039,995 B2 | 10/2011 | Stevens et al. |
| 8,129,864 B2 | 3/2012 | Baarman et al. |
| 2007/0145830 A1 | 6/2007 | Lee et al. |
| 2008/0204181 A1 | 8/2008 | Tolle et al. |
| 2009/0015075 A1 | 1/2009 | Cook et al. |
| 2009/0058189 A1 | 3/2009 | Cook et al. |
| 2009/0174263 A1 | 7/2009 | Baarman et al. |
| 2010/0052431 A1 | 3/2010 | Mita |
| 2010/0109443 A1 | 5/2010 | Cook et al. |
| 2010/0117454 A1 | 5/2010 | Cook et al. |
| 2010/0225272 A1 | 9/2010 | Kirby et al. |
| 2010/0237709 A1* | 9/2010 | Hall et al. ............ 307/104 |
| 2010/0277120 A1 | 11/2010 | Cook et al. |
| 2011/0095618 A1 | 4/2011 | Schatz et al. |
| 2011/0281535 A1 | 11/2011 | Low et al. |
| 2011/0285349 A1 | 11/2011 | Widmer et al. |
| 2012/0001485 A1* | 1/2012 | Uchida ............ 307/11 |

FOREIGN PATENT DOCUMENTS

| | | |
|---|---|---|
| EP | 2 306 617 | 4/2011 |
| EP | 2 369 711 | 9/2011 |
| WO | WO 2009/054221 | 4/2009 |
| WO | WO 2010/041318 | 4/2010 |
| WO | WO 2010/062198 | 6/2010 |
| WO | WO 2010/126010 | 11/2010 |

OTHER PUBLICATIONS

PCT Written Opinion of the International Searching Authority for Application No. PCT/US2011/039725 mailed on Aug. 27, 2012.

Circuit Analysis of Wireless Power Transfer by "Coupled Magnetic Resonance", F.Z. Shen et al, pp. 602-605, Dec. 7, 2009.

\* cited by examiner

COIL CONFIGURATIONS FOR INDUCTIVE POWER TRANSFER

FIELD OF THE INVENTION

The present invention relates to wireless power supply systems, and more particularly to coil configurations for wireless power supply systems.

BACKGROUND OF THE INVENTION

Inductive power supply systems allow power to be transferred to an electronic device, such as a portable device, without the need for direct electrical connections. Inductive power transfer may be achieved using inductors, which produce magnetic fields when current flows through them. Conversely, current may be induced in an inductor when in the presence of a magnetic field, such as the magnetic field produced by another inductor. If two inductors are placed in proximity and one inductor is driven with a current, then the other inductor will produce a current even though the two inductors are not directly connected. This interrelationship between the two inductors is generally called inductive coupling, and many have used this phenomenon to transfer power without electrical connections.

In fact, many of the fundamental principles of wireless power transfer have been known for 100 years or more. Nicola Tesla, who is widely regarded as the father of wireless power transfer, is reputed to have demonstrated a system for wirelessly powering a light bulb as early as 1893. Tesla spent many years conducting research and development in the field, and amassed a significant portfolio of patents relating to wireless power transfer. As we see a resurgence of interest in wireless power, some of his early inventions are being used by those developing wireless power systems today. For example, U.S. Pat. Nos. 649,621 and 685,012 to Tesla disclose that inductive power transfer between a primary coil and a secondary coil may be improved by incorporating an additional set of intermediate coils that function as "resonating" coils to magnify the oscillations and communicate power between a primary unit and a secondary unit. More specifically, the primary unit includes a pair of coils that work together to transmit power to the secondary unit and the secondary unit includes a pair of coils that work together to receive the power. The primary unit includes a primary coil that is electrically connected to and directly receives power from the power source, as well as a resonating coil that is coupled inductively to the directly-powered coil. The resonating coil receives power inductively from the primary coil, magnifies the oscillations, and generates an electromagnetic field to communicate the power to the secondary unit. Tesla also demonstrated that capacitance used in combination with the resonating coil may produce even larger oscillations than the resonating coil by itself. The secondary unit includes another resonating coil that receives the electromagnetic field generated by the primary unit resonating coil and a secondary coil that is inductively coupled to the secondary resonating coil to directly transmit power to the secondary load. So, as can be seen, the concept of using a separate set of intermediate coils to provide an inductive coupling with improved performance has been known for over a century.

Although the basic concepts of wireless power transfer have been around for many years, there has been a relatively recent resurgence in the interest in the technology, and widespread efforts are being made to implement practical and efficient wireless power transfer systems. There are a variety of factors that complicate development of efficient systems. For example, operating characteristics (i.e. conditions under which the system is operating) can have a significant impact of the quality and efficiency of the power transfer. As another example, mutual inductance can have a material impact on the efficiency of the power transfer between the primary unit and the secondary unit. Mutual inductance depends on a number of circuit parameters, including the distance between the primary unit resonating coil and the secondary unit resonating coil. As the distance between the primary unit resonating coil and the secondary unit resonating coil is minimized, the mutual inductance increases. This inverse relationship between the distance and the mutual inductance may impose restrictions on the operating parameters of the system.

The energy transfer efficiency of the primary unit and secondary unit may be improved by varying the operating parameters of the power supply system to accommodate different operating conditions. As a result, high efficiency power supply systems have been developed that adapt the operating parameters of the power supply in response to changing operating characteristics, such as relative distance and orientation between the primary unit and the secondary unit (or receiver unit). Adaptive power supply systems may vary operating parameters, such as the resonant frequency of the primary unit or the secondary unit, or the operating frequency, duty cycle or rail voltage of the drive signal. However, variable drive frequency solutions tend to rely heavily on closer proximity or higher mutual inductance to control power transfer efficiency between the primary unit and the secondary unit. As a result, variable drive frequency solutions generally lack spatial freedom between the primary unit and the secondary unit.

In variable resonant frequency systems, the spatial freedom may be greater than a variable drive frequency system because the system is not as reliant on close proximity or higher mutual inductance. However, precise control over power transfer efficiency may be more problematic because variable resonant frequency systems are not as finely tunable as the variable drive frequency solutions. This is why a variable resonant frequency system may produce mixed results during actual use.

SUMMARY OF THE INVENTION

The present invention provides an inductive power supply system in which the receiving unit includes a secondary tank coil and a plurality of resonating circuits with different characteristics. Each of the resonating circuits may include a resonating coil and a resonating capacitor. The resonating coils may be inductively coupled to the secondary coil so that energy may be transferred from one or more of the resonating coils to said receiving unit. The plurality of resonating circuits are configured to provide improved power transfer efficiency or performance at different distances between the primary coil or primary and the secondary coil or secondary. In one embodiment, the various resonating circuits are configured to provide improved performance by taking into account the affect on mutual inductance when the receiving unit is at different locations with respect to the primary unit. For example, each of the resonating circuits may have a different resonant frequency.

In one embodiment, the secondary coil may be configured to provide improved performance when the receiving unit is in close proximity to the primary unit and the affect of the receiving unit through mutual inductance is higher. One of the plurality of resonating circuits may be selected to provide improved performance when the distance between the primary unit and the receiving unit has increased so that the affect of the receiving unit through mutual inductance is materially reduced. Another of the plurality of resonating circuits may be selected to provide improved performance when the distance between the primary unit and the receiving unit is great enough that the affect of the receiving unit through mutual inductance is low.

In one embodiment, the receiving unit may include a secondary tank circuit and at least one resonating circuit. The secondary tank circuit may include a secondary tank coil and secondary tank capacitor. The secondary tank circuit may have a variable resonant frequency using circuitry, such as a tuning network. One or more of the resonating circuits may have a variable resonant frequency using similar tuning circuitry. When the remote device is in close proximity where the affect on mutual inductance is higher, the secondary tank circuit may be selected and have its resonant frequency adjusted to provide improved performance. In circumstances where mutual inductance is reduced, a resonating circuit may be selected and have its resonant frequency adjusted to provide improved performance.

In another embodiment, the receiving unit may include at least one resonating circuit connected to a switch. The switch may be turned on or off to effectively remove the resonating circuit from the system so that it may have a minimal affect on mutual inductance based on tuning and the switch. When the receiving unit is within a certain proximity range, the switch may be used to select one or more of the resonating circuits that may be appropriate for efficient power transfer because of the affect on mutual inductance at that distance. If the remote device is within another proximity range where the affect on mutual inductance is different, another resonating circuit or circuits may be selected with switches. Moreover, if the proximity of the receiving unit is such that the affect on mutual inductance is relatively high, then a resonating circuit may not be selected. In these circumstances, the receiving unit may use a secondary tank circuit to receive power from the primary unit. The secondary tank circuit may also be switched in and out of the system.

In one embodiment, the primary unit may include a primary coil and a primary resonating circuit that may be inductively coupled to the primary coil. The primary resonating circuit may include a primary resonating coil and a primary resonating capacitor. Further, the primary resonating circuit may transfer power to the receiving unit through inductive coupling with a secondary tank circuit or another resonating circuit located within the receiving unit.

In another embodiment, the primary unit may include a switch for switching the primary resonating circuit in and out of the circuit. When the primary resonating circuit is active in the primary unit, energy may be transferred through inductive coupling between the primary resonating circuit and a secondary tank circuit or a resonating circuit in the receiving unit. In other circumstances, the primary resonating circuit may be switched out of the primary unit's circuitry. In this case, the primary coil may transfer energy via inductive coupling with the secondary tank circuit or a resonating circuit in the receiving unit.

In another embodiment, the primary unit may include a primary coil that operates without resonance (e.g. without tank circuit capacitance). The primary coil may inductively couple with a coil located within the receiving unit or with a primary resonating coil located in the primary unit. If the primary coil inductively couples with a primary resonating coil, then the primary resonating coil may inductively couple with a coil located within the receiving unit to transfer energy to the receiving unit.

In another aspect, the present invention may provide a method for tuning the wireless power system including the general steps of measuring an operating characteristic in the primary unit, measuring an operating characteristic in the receiver unit and tuning one or more of the components in the primary unit and the secondary unit based on a comparison of the two measurements. The method for tuning may be used with respect to the primary coil and the secondary coils to determine an understanding of the appropriate settings for inductive coupling between the primary unit and the secondary unit. For example, the wireless power system may compare the two measurements and tune the primary unit and/or receiver unit to improve power transfer efficiency. Based upon the comparison, the wireless power system may determine (1) if the resonant frequency of the primary unit may be tuned differently and (2) if the resonant frequency or frequencies of the receiver unit may be tuned differently to improve power transfer efficiency.

In one embodiment, a method for operating the wireless power system includes sweeping the drive frequency of the primary unit to build a frequency response table. The frequency response table may include measured conditions in the primary unit, secondary unit, or both at various circuit locations. These measured conditions may be various forms of current measurements or voltage measurements, such as peak current/voltage, rms current/voltage, and peak-to-peak current/voltage. The wireless power system may adjust the resonant frequency of the secondary tank circuit and/or one of the plurality of resonating circuits to improve power transfer efficiency. The wireless power system may also adjust at least one of rail voltage, operating frequency, and duty cycle to provide power to the receiver unit.

The present invention provides a simple and effective wireless charging system that allows spatial freedom and improved power transfer efficiency. The wireless charging system includes a plurality of resonating circuits that are configured to provide improved power transfer efficiency at various distances between the receiver unit and the primary unit. This may be accomplished by accounting for the affect on mutual inductance that the receiver unit has on the primary unit at the various distances. What is more, the wireless power system may finely tune the operating frequency and other circuit parameters to achieve improved power transfer efficiency.

These and other features of the invention will be more fully understood and appreciated by reference to the description of the embodiments and the drawings.

Figure 1:
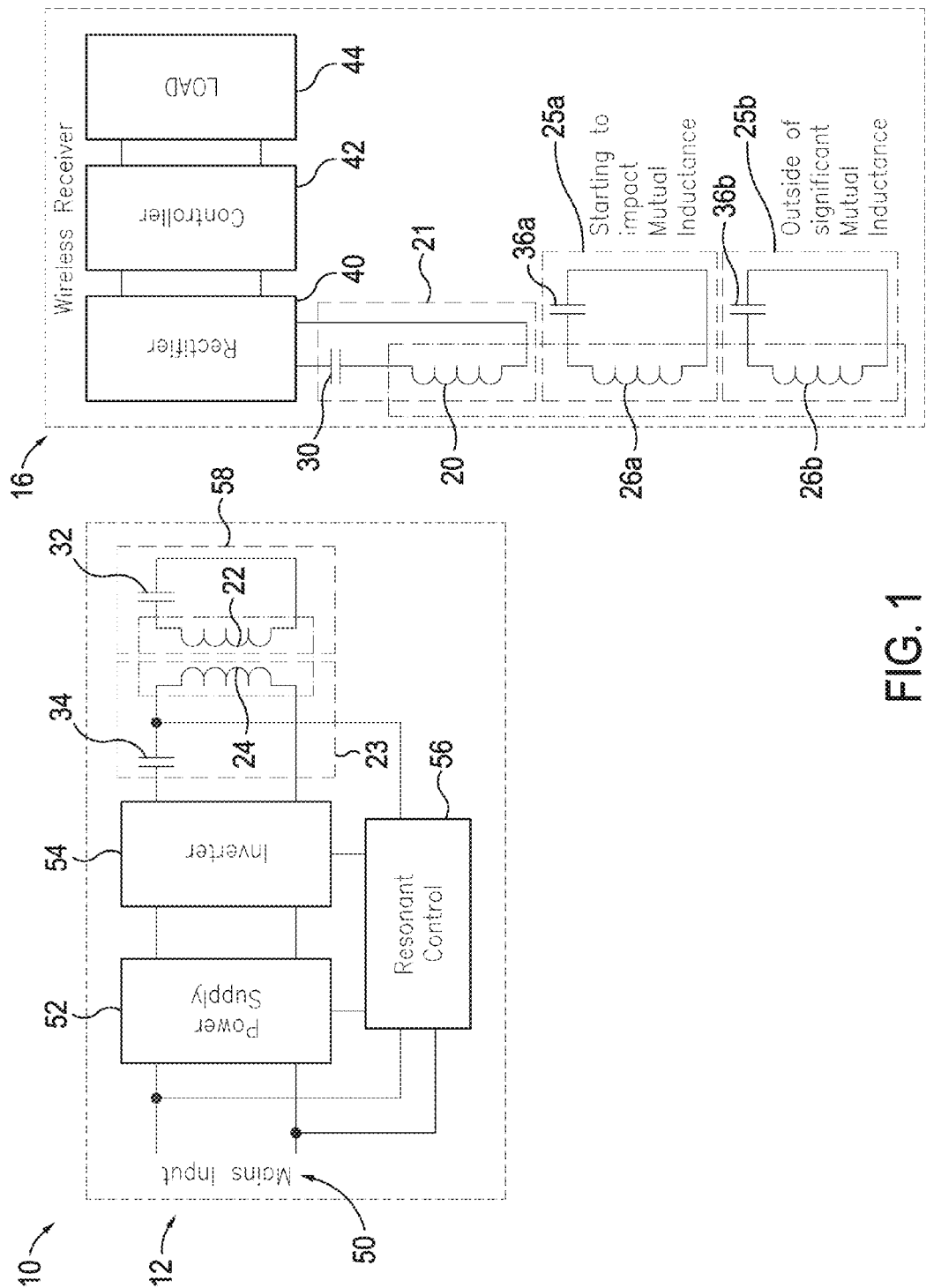
FIG. 1 is a representative view of one embodiment of the wireless power system with coil configurations.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DESCRIPTION OF CURRENT EMBODIMENTS

A wireless power supply system 10 in accordance with an embodiment of the present invention is shown in FIG. 1. The wireless power supply system 10 includes a primary unit 12 that transmits power using an electromagnetic field and a portable device having a receiver unit 16 for receiving the power transmitted via the electromagnetic field. The portable device is separate from and readily movable with respect to the primary unit 12. The receiver unit 16 includes a secondary tank circuit 21 and a plurality of resonating circuits 25a-b. The secondary tank circuit 21 and the plurality of resonating circuits 25a-b may each be configured differently to provide improved power transfer efficiency when the portable device is at different locations with respect to the primary unit 12. Configuration may be achieved using any number of approaches that change circuit impedance. The number of different receiver unit 16 resonating circuits 25a-b may vary from application to application depending on various factors including the range of variation in the affect of the portable device on mutual inductance, costs, and available space. Accordingly, the present invention includes a receiver unit 16 capable of adapting to a wide range of operating parameters, such as the receiver unit's 16 location with respect to the primary unit 12.

Figure 4:
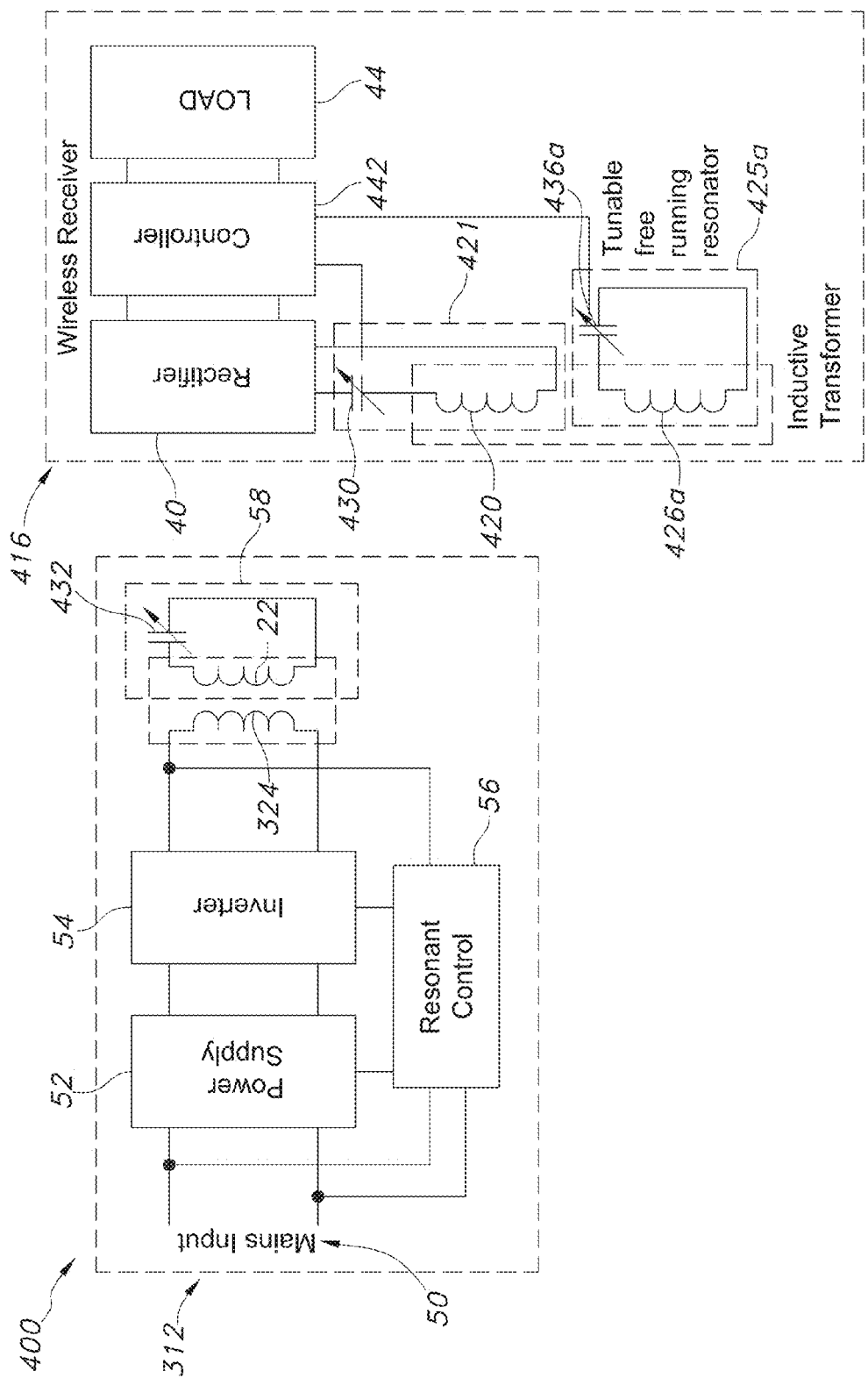
FIG. 4 is a representative view of one embodiment of the wireless power system with coil configurations.
Figure 5:
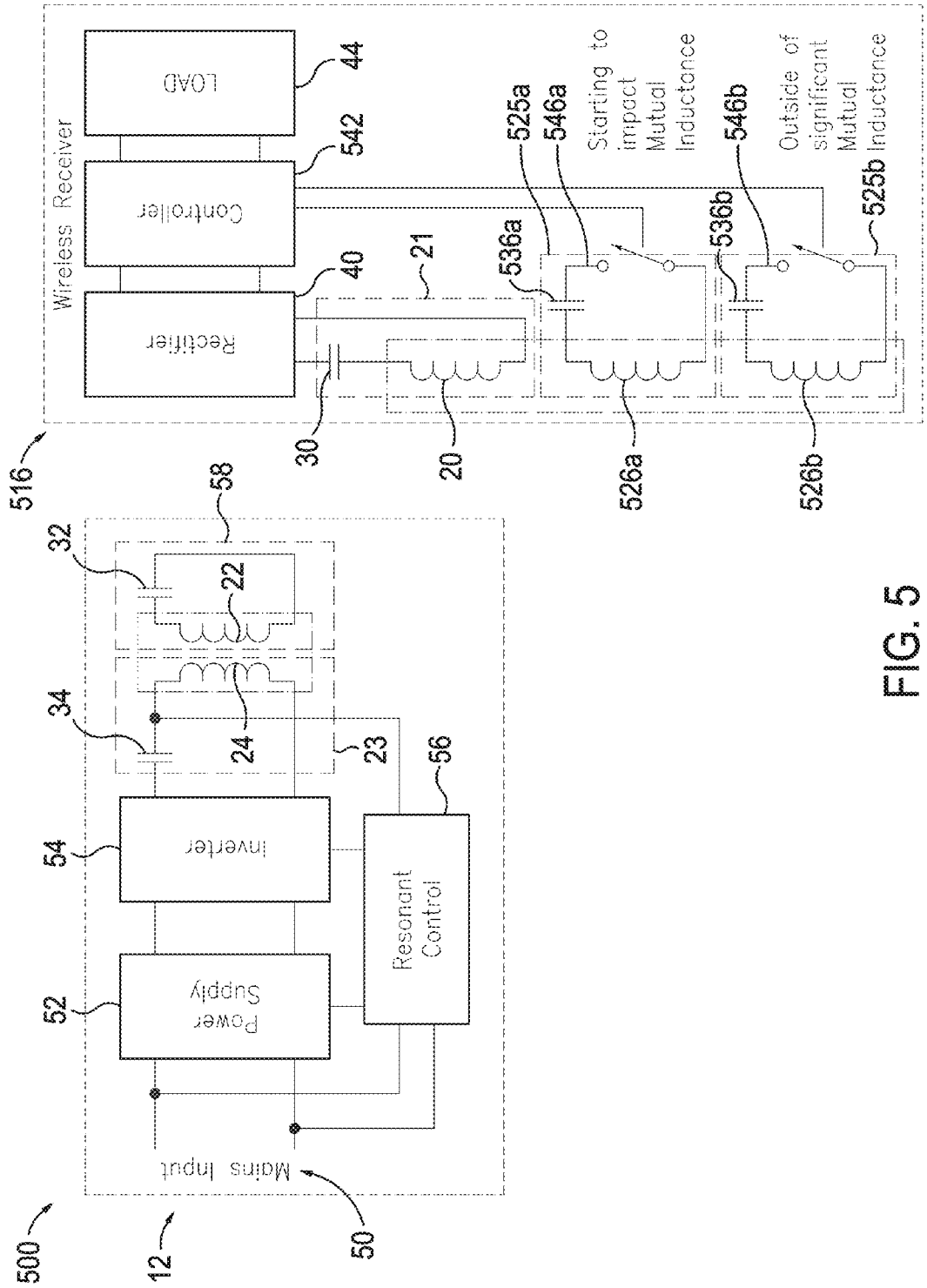
FIG. 5 is a representative view of one embodiment of the wireless power system with coil configurations.

As shown in FIGS. 1, 4, and 5, the receiver unit 16, 416, 516 may have multiple configurations. These configurations may be combined in any number of combinations to produce a receiver unit capable of receiving power wirelessly from a primary unit. In one embodiment, the receiver unit 416 includes variable capacitors 430, 436a that may be used to adjust the resonant frequency of the secondary tank circuit 421 or resonating circuits 425a in the receiver unit. Alternative embodiments of the receiver unit 516 may include switches that control whether a resonating circuit 525a-b is active in the wireless power supply system 500 such that it has an affect on mutual inductance.

For purposes of disclosure, the receiver unit 16 is described separately from the portable device. The receiver unit 16 may, however, be integrated with a portable device to provide power to portable device components such as a battery or other circuitry. In one embodiment, the portable device may be a cellular phone or other mobile device and may be placed near the primary unit 12 to receive power wirelessly for performing operations, such as battery charging, operating a display, or processor functions. In other embodiments, the receiver unit 16 may be separable from the portable device. For example, the receiver unit 16 may be an adapter that connects to the portable device and provides it power from the primary unit 12.

The primary unit 12 may be any type of inductive wireless power supply capable of transmitting power via an electromagnetic field. In one embodiment, the primary unit 12 may change operating frequency depending on a number of characteristics, such as power transfer efficiency. For purposes of disclosure, the present invention is described in connection with a particular primary unit 12 for applying power wirelessly to the receiver unit 16. The present invention is, however, well suited for use with other wireless power supply circuitry and may alternatively include essentially any wireless power supply circuitry capable of applying power to a driven primary. For example, the present invention may be incorporated into a wireless power supply system including the inductive power supply disclosed in U.S. Ser. No. 61/019,411, which is entitled "Inductive Power Supply with Duty Cycle Control" and filed Jan. 7, 2008 by Baarman; the inductive power supply of U.S. Pat. No. 7,212,414, which is entitled "Adaptive Inductive Power Supply" and issued May 1, 2007, to Baarman; or the inductive power supply with communication of U.S. Ser. No. 10/689,148, which is entitled "Adaptive Inductive Power Supply with Communication" and filed on Oct. 20, 2003 to Baarman—all of which are incorporated herein by reference in their entirety.

In some embodiments, the primary unit 12 may include a primary resonating coil 22 and primary resonating capacitor 32 to produce an electromagnetic field when excited by a primary coil 24. This electromagnetic field may be used to transfer power wirelessly to a receiver unit 16. In other embodiments, the primary resonating coil 22 and primary resonating capacitor 32 may not be included in the primary unit 12. In these configurations, the primary coil 24 may be used to transfer power wirelessly to a receiver unit 16.

Figure 2:
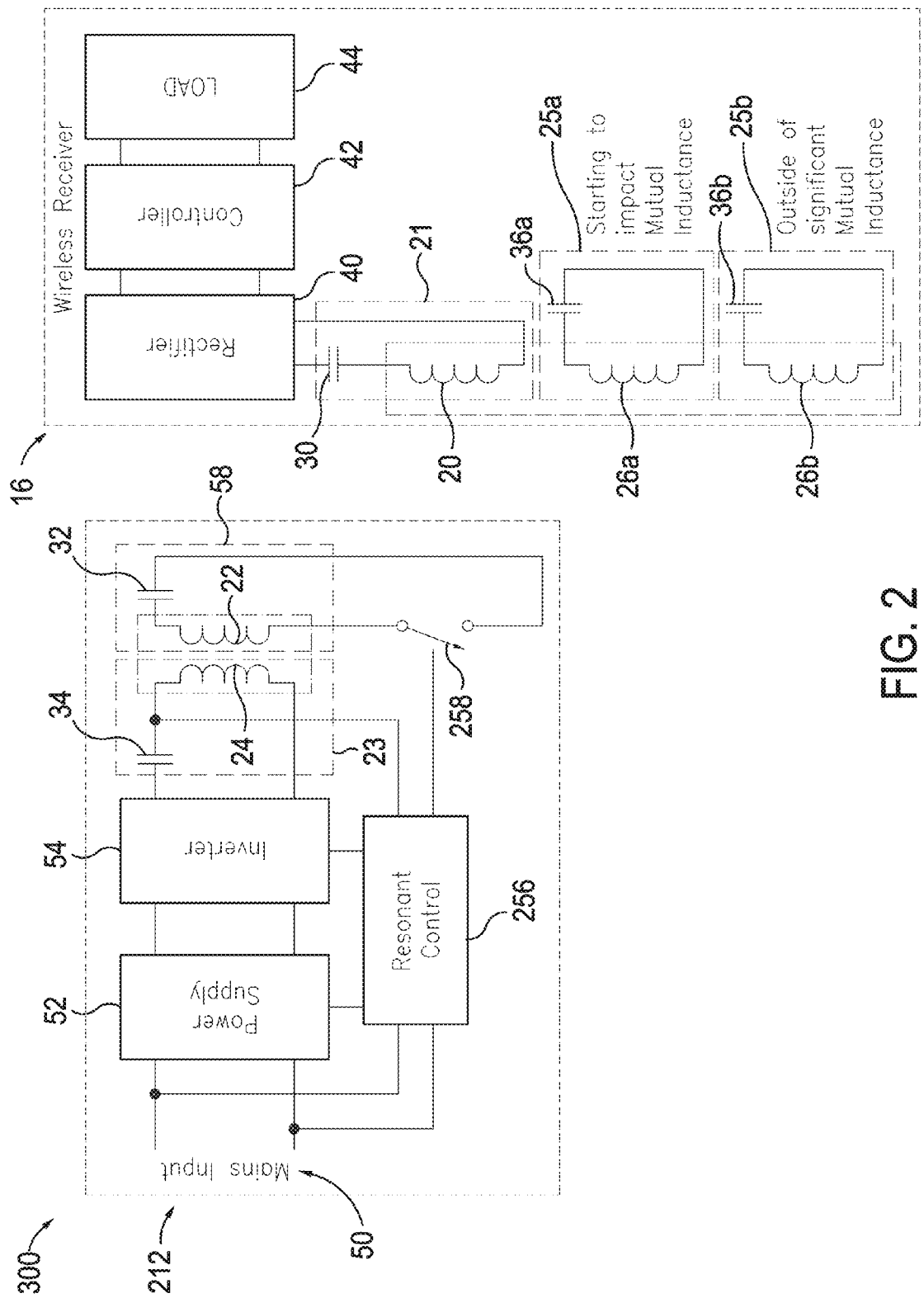
FIG. 2 is a representative view of one embodiment of the wireless power system with coil configurations.
Figure 3:
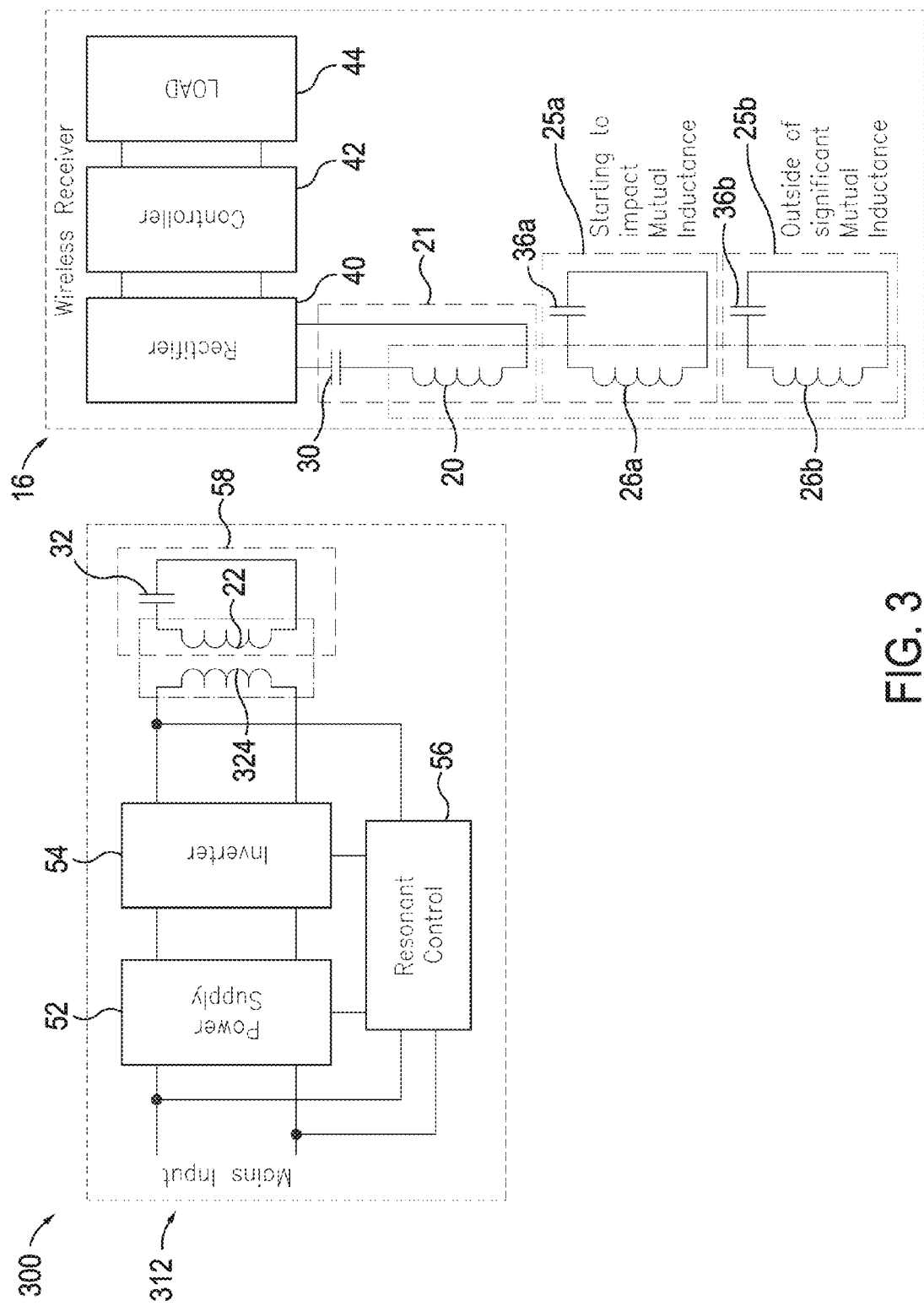
FIG. 3 is a representative view of one embodiment of the wireless power system with coil configurations.

FIGS. 1-3 also show various embodiments of the primary unit 12, 212, 312 having various configurations. In one embodiment, the primary unit 212 may include a switch 258 that allows it to control whether the primary resonating coil 22 is actively used for transferring power wirelessly to a receiver unit. In an alternative embodiment, the primary unit 312 may operate without a capacitor.

Various methods of tuning an embodiment of the wireless power supply system 10 are shown in FIGS. 8-10 and 13. Of course, the method of tuning may change from application to application depending on the primary unit 12 and receiver unit 16 configurations. In one embodiment, the method may measure an operating characteristic in the primary unit 12 and the receiver unit 16. For example, the operating characteristic may be the frequency response of the primary unit 12 and the receiver unit 16. The two measurements may be compared so that the wireless power system 10 may determine whether to tune the resonant frequency of the primary tank coil 24, primary resonating coil 22 (if present), the secondary tank coil 20, and/or the resonating coils 26a-b. The wireless power system 10 may tune these components to achieve improved power transfer efficiency.

In the embodiment of FIG. 1, the wireless power supply system 10 includes a primary unit 12 and a receiver unit 16. The receiver unit 16 includes a secondary tank circuit 21, a plurality of resonating circuits 25a-b, a rectifier 40, controller 42, and load 44. The secondary tank circuit 21 may include a secondary tank coil 20 and a secondary resonating capacitor 30. Each of the resonating circuits 25a-b may include a resonating coil 26a-b and resonating capacitor 36a-b. The secondary tank coil 20 and plurality of resonating coils 26a-b may be made of a coiled conductor to produce a desired inductance. For example, the secondary tank coil 20 and plurality of resonating coils 26a-b may be PCB traces or Litz wire. The secondary tank coil 20 and plurality of resonating coils 26a-b may each have similar or different inductances depending on the desired tuning for each. The secondary tank capacitor 30 and resonating capacitors 36a-b may be one or many capacitors of varying capacitance depending on the desired configuration. In alternative embodiments, at least one of the secondary tank coil 20, secondary tank capacitor 30, plurality of resonating coils 26a-b, and resonating capacitors 36a-b may be variable during circuit operation.

Together, the secondary tank coil 20 and its associated secondary tank capacitor 30 may form a circuit that resonates around a particular frequency. Each of the plurality of resonating coils 26a-b and their associated resonating capacitors 36a-b may also form individual circuits that resonate around different frequencies. The particular configuration for each of the secondary tank coil 20 and the plurality of resonating coils 26a-b may provide for improved power transfer efficiency with the primary unit 12 at various distances. At the various distances, the secondary tank circuit 21 and the plurality of resonating circuits 25a-b may have a different affect on mutual inductance with the primary unit 12. Accordingly, the secondary tank circuit 21 and the plurality of resonating circuits 25a-b may each be configured for improved power transfer efficiency at various distances depending on their affect on mutual inductance. In alternative embodiments, the secondary tank circuit 21 and the plurality of resonating circuits 25a-b may be configured so that resonant conditions occur near the same frequency at various distances. For example, when the secondary tank circuit 21 provides improved power transfer efficiency at one distance, the resonant frequency may be substantially similar to the resonant frequency that occurs with a configuration for improved power transfer efficiency using a resonating circuit 25a-b at another distance. This alternative embodiment may allow the primary unit 12 to use similar operating parameters, such as operating frequency, at various distances while utilizing different configurations based on their affect on mutual inductance.

In the current embodiment, the secondary tank circuit 21 and the plurality of resonating circuits 25a-b may be inductively coupled to one another. This may be achieved by proximity or a combination of proximity and magnetic flux guides. When one of the plurality of resonating circuits 25a-b is more appropriately configured for improved power transfer efficiency than the secondary tank circuit 21, that resonating coil may be used to receive power from the primary unit 12 and subsequently, may inductively transfer its energy to the secondary tank coil 20. If the secondary tank circuit 21 is more appropriately configured than each of the plurality of resonating circuits 25a-b, then the secondary tank circuit 20 may be used to supply power to the receiver unit 16. As can be seen from this description, a circuit that provides for optimum performance may be selected for improved power transfer efficiency.

The rectifier 40 may include circuitry well known in the art for converting a signal received from the secondary tank circuit 21 into a rectified output for controller 42. For example, the rectifier 40 may transform an AC signal received from the secondary tank circuit 21 into a full wave rectified output. In alternative embodiments, the rectifier 40 may also include circuitry for smoothing the rectified output into a substantially DC output to the controller 42. In the current embodiment, the controller 42 may include circuitry well known in the art for receiving a rectified input and providing power to the load 44. The controller 42 may detect and regulate power to the load 44 so that the load may receive an appropriate amount of energy. The load 44 may include any type of electrical impedance, such as receiving unit 16 circuitry or a mobile device. In alternative embodiments, the load 44 may be externally connected to the receiving unit 16 so that the receiving unit may be separable from the load 44.

In the current embodiment, the controller 42 may wirelessly communicate with the primary unit 12 using various techniques. For example, the controller 42 may use transceiver circuitry (not shown) to wirelessly communicate with the primary unit 12 via IEEE 802.11, Bluetooth, or IrDA protocols. As another example, the controller 42 may be capable of wirelessly communicating over the secondary tank circuit 21 or the plurality of resonating circuits 25a-b using modulation techniques.

The receiving unit 16 and primary unit 12 may exchange information such as operation parameters. For example, operation conditions may include circuit measurements, circuit characteristics, or device identification information. In alternative embodiments, the receiver unit 16 and primary unit 12 may not communicate with each other. In these embodiments, the primary unit 12 may detect operation conditions of the receiver unit 16 by identifying the reflected impedance of the receiver unit 16. In yet another alternative embodiment, the primary unit 12 may communicate with the portable device, which is connected to the receiving unit 16, to transmit and receive operation conditions.

In the embodiment of FIG. 1, the primary unit 12 may include mains input 50, power supply 52, inverter 54, resonant control 56, primary resonating circuit 58, and primary tank circuit 23. The primary tank circuit 23 may include primary capacitor 34, and primary coil 24. The power supply 52, inverter 54, and resonant control 56 may include circuitry well known in the art. The power supply 52 receives power from the mains input 50, where the mains input 50 may be AC power, DC power, or another suitable energy source. The power supply 52 may convert the power from mains input 50 into energy useable by the inverter 54. For example, the power supply 52 may provide DC power to the inverter 54 at a specified rail voltage. Further, the power supply 52 may receive commands from the resonant control 56 to change the output rail voltage. The inverter 54 may provide power to the primary tank circuit 23. The inverter 54 may be commanded by the resonant control 56 to provide AC power to the primary tank circuit 23 at a specified frequency, duty cycle, or both. As a result, the primary unit 12 may provide power to the primary tank circuit 23 at a commanded rail voltage, duty cycle, frequency, or a combination of the three.

The primary capacitor 34 and primary coil 24 included in the primary tank circuit 23 may be constructed similarly to the secondary tank capacitor 30 and secondary tank coil 20 described above with regard to the receiving unit 16. The primary coil 24 and primary capacitor 34 may receive power from the inverter 54 and transfer that power to the primary resonating circuit 58 via inductive coupling between the primary coil 24 and the primary resonating coil 22 included in the resonant circuit 58.

In the current embodiment, the resonating circuit 58 may include a primary resonating capacitor 32 and a primary resonating coil 22, such that the resonating circuit 58 has a resonant frequency. The primary resonating capacitor 32 and primary resonating coil 22 may be of similar construction to the resonating capacitors 36a-b and secondary resonating coils 26a-b described above with regard to the receiving unit 16. The primary resonating coil 22 may transfer energy to the receiving unit 16, as described above, via inductive coupling with at least one of the secondary tank circuit 21 and the plurality of resonating circuits 25a-b. In alternative embodiments, the primary resonating circuit 58 is not included in the primary unit 12. In these embodiments, the primary tank circuit 23 may transfer power to the receiving unit 16, as described above, through inductive coupling with at least one of the secondary tank circuit 21 and the plurality of resonating circuits 25a-b.

An alternative wireless power supply system 200 is shown in FIG. 2. The wireless power supply system 200 of FIG. 2 includes a primary unit 212 and a receiver unit 16. The receiver unit 16 of FIG. 2 may be similar to the receiver unit 16 described with regard to FIG. 1, where the receiver unit 16 of the current embodiment may be configured to receive power transmitted from the primary unit 212 via an electromagnetic field. Accordingly, the receiver unit 16 may receive power over a wide range of locations with respect to the primary unit 212 because of the ability to take into account the affect on mutual inductance. Further, the receiver unit 16 may be included in a portable device (not shown).

The primary unit 212 may include components similar to primary unit 12, such as the mains input 50, power supply 52, inverter 54, primary tank capacitor 34, primary tank coil 24, primary resonating capacitor 32, and primary resonating coil 22. Of course, these components may be configured to perform the functionality of the primary unit 212. For example, the primary resonating capacitor 32 and the primary resonating coil 22 may be configured to resonate around a frequency, while the primary tank capacitor 34 and primary tank coil 24 may be configured to resonate around a different frequency. The primary unit 212 may further include resonating circuit switch 258 and a resonant control 256, where the resonant control 256 may include functionality similar to the resonant control 56 described above.

In the embodiment of FIG. 2, the resonant control 256 may control transmission of power to the receiver unit 16 via inductive coupling with either the primary tank coil 24 or the primary resonating coil 22. The resonant control 256 may control the resonating circuit switch 258 to regulate whether the primary tank coil 24 or the primary resonating coil 22 is used to produce an electromagnetic field for energy transmission. The resonant control 256 may make this decision depending on a number of operation conditions, such as the primary unit's 212 configuration, the receiving unit's 16 configuration, and circuit measurements of the wireless power supply system 200. This determination may also be based on the mutual inductance between (1) at least one of the secondary tank circuit 21 and the plurality of resonating circuits 25a-b and (2) either the primary tank circuit 23 or the primary resonating circuit 58. For example, the secondary resonating circuit 25a and primary resonating circuit 58 may have a mutual inductance at a certain distance between the primary unit 12 and receiver unit 16 that offers improved power transfer over other combinations at that distance. As a result, the wireless power supply system 200 may achieve improved power transfer and spatial freedom by using a combination of circuits that produces improved power transfer efficiency between the primary unit 12 and the receiving unit 16.

Another alternative wireless power supply system 300 is shown in FIG. 3. In this embodiment, the wireless power supply system 300 includes a primary unit 312 and a receiver unit 16. The receiver unit 16 of FIG. 3 may be similar to the receiver unit 16 described with regard to FIGS. 1 and 2, where the receiver unit 16 of the current embodiment may be configured to receive power transmitted from the primary unit 312 via an electromagnetic field. Accordingly, the receiver unit 16 may receive power over a wide range of locations with respect to the primary unit 312 because of the ability to take into account the affect on mutual inductance. Further, the receiver unit 16 may be included in a portable device (not shown).

The primary unit 312 may include components similar to primary unit 12, such as the mains input 50, power supply 52, inverter 54, resonant control 56, and resonating circuit 58. The primary unit 312 also includes a primary coil 324 that may be inductively coupled to the resonating circuit 58. The primary coil 324 may indirectly provide energy to the receiver unit 16 by inductively transferring energy to the resonating circuit 58, which subsequently transfers energy to the receiving unit 16. Receiver unit 16 may receive this energy using at least one of the secondary tank circuit 21 and the plurality of resonating circuits 25a-b similar to the receiver 16 described above with regard to FIG. 1. In alternative embodiments, the resonating circuit 58 may not be present in the primary unit 312. In these embodiments, the primary coil 324 inductively provides power to the receiver unit 16 using an electromagnetic field without resonance (e.g. without tank circuit capacitance). In some circumstances, tank circuit capacitance limits the dynamic range of the receiver unit 16 with respect to the primary unit 312, and as a result, tank circuit capacitance may be selected based on a desired range configuration. In yet another alternative embodiment, the receiver unit 16 may inductively receive power without tank circuit capacitance in the secondary tank circuit, resonating circuits, or both.

Yet another alternative embodiment of the wireless power supply system 400 is shown in FIG. 4. The wireless power supply system 400 shown in FIG. 4 includes a primary unit 312 and a receiver unit 416. The primary unit 312 of FIG. 4 may be similar to the primary unit 312 described with regard to FIG. 3, where the primary unit 312 of the current embodiment may be configured to transfer power to the receiver unit 416 via an electromagnetic field produced by the primary resonating circuit 58. The primary resonating capacitor 432 in this embodiment is a variable capacitor. Controller 56 may adjust the resonant frequency of the resonating circuit 58 by adjusting the capacitance of the variable capacitor. Of course, in alternative embodiments, the primary resonating capacitor 432 may be a fixed capacitance. In further alternative configurations, the primary coil 324 may be electrically connected to a variable primary capacitor, which may be selectively adjusted. In this way, the controller 56 may selectively adjust the variable primary capacitor in order to affect the resonant frequency of the primary tank circuit.

Furthermore, the primary unit 312 may control operation of the primary coil 324 and the primary resonating circuit 58 depending on characteristics of the receiver unit 416, such as the resonant frequencies of the secondary tank circuit 421 and resonating circuit 426a. In alternative embodiments, the primary unit 312 may not include a resonating circuit 58, where the primary coil 324 may transfer power inductively to the receiver unit 416.

The receiver unit 416 may include components similar to receiver unit 16, such as rectifier 40 and load 44. In the current embodiment, the rectifier 40 and load 44 may be appropriately configured to perform the functionality of the receiver unit 416. The receiver unit 416 may also include controller 442, secondary tank circuit 421, and resonating circuit 425a. In alternative embodiments, there may be a plurality of resonating circuits 425a. The secondary tank circuit 421 may include secondary tank coil 420 and secondary tank capacitor 430. The resonating circuit 425a may include a resonating coil 426a and resonating capacitor 436a. The secondary tank coil 420 and resonating coil 426a may be similarly constructed to the secondary tank coil 20 and secondary resonating coil 426a described with regard to FIG. 1. The secondary tank capacitor 430 and resonating capacitor 436a may be variable capacitors or capacitor arrays capable of changing their capacitance in response to commands from the controller 442. For example, the variable capacitors may be similarly constructed to the embodiment described with regard to FIG. 12. The controller 442 may be similar to the controller 42 described with respect to FIGS. 1-3, and may control the capacitance of the secondary tank capacitor 430 and resonating capacitor 436a depending on a desired tuning of the resonating circuits. For example, the resonant frequency of the secondary tank circuit 421 may be adjusted using the variable capacitance of the secondary tank capacitor 430. In alternative embodiments, the secondary tank coil 420 and resonating coil 426a may be variable inductors and be variably controlled by the controller 442. In yet another alternative embodiment, the secondary tank coil 420, resonating coil 426a, secondary tank capacitor 430, and resonating capacitor 436a may be variably controlled by the controller 442.

The receiver unit 416 may adjust the resonating frequency of at least one of the secondary tank circuit 421 and the resonating circuit 425a depending on the desired tuning and the affect on mutual inductance that exists between the receiver unit 416 and the primary unit 312. As a result, the receiver unit 416 and primary unit 312 may achieve improved power transfer and spatial freedom with respect to each other.

A further alternative embodiment of the wireless power supply system 500 is shown in FIG. 5. Referring now to FIG. 5, the wireless power supply system 500 includes a primary unit 12 and a receiver unit 516. The primary unit 12 of FIG. 5 may be similar to the primary unit 12 described with regard to FIG. 1, where the primary unit 12 of the current embodiment may be configured to transfer power to the receiver unit 516 via an electromagnetic field produced by the primary resonating circuit 58. Furthermore, the primary unit 12 may control operation of the primary tank circuit 23 and the primary resonating circuit 58 depending on characteristics of the receiver unit 516, such as the resonant frequencies and status of the secondary tank circuit 21 and the plurality of resonating circuits 525a-b. In alternative embodiments, the primary unit 12 may not include a resonating circuit 58, where the primary circuit 23 may transfer power inductively to the receiver unit 516.

The receiver unit 516 may include components similar to receiver unit 16, such as rectifier 40, load 44, and secondary tank circuit 21. The receiver unit 516 may also include controller 542 and a plurality of resonating circuits 525a-b. Each of the plurality of resonating circuits 525a-b may include a resonating coil 526a-b, a resonating capacitor 536a-b, and a secondary resonating switch 546a-b. The resonating coils 526a-b and resonating capacitors 536a-b may be similar to the secondary resonating coils 26a-b and resonating capacitors 36a-b described in FIG. 1. Consequently, each of the plurality of resonating circuits 525a-b may have a resonant frequency. The controller 542 may include circuitry known in the art for controlling the secondary resonating switches 546a-b. The controller 542 may operate the secondary resonating switches 546a-b to turn on and off their associated resonating circuits 525a-b. By switching the secondary resonating circuit 525a-b in and out of the wireless power supply system 500, the controller 542 may use the appropriate secondary resonating circuit 525a-b depending on the resonant frequency of that secondary resonating circuit 525a-b and its affect on the mutual inductance of the wireless power supply system 500. Further, the controller 542 may select one or a plurality of secondary resonating circuits 525a-b depending their affect on the mutual inductance. As a result, the wireless power supply system 500 may achieve improved power transfer and spatial freedom between the primary unit 12 and the receiver unit 516. In alternative embodiments, the secondary tank circuit 21 may also be switched in and out of the wireless power supply system 500. For example, the secondary tank circuit 21 may be switched out of the wireless power supply system 500 in circumstances where charging of the portable device has finished or an overvoltage condition has occurred.

Figure 6:
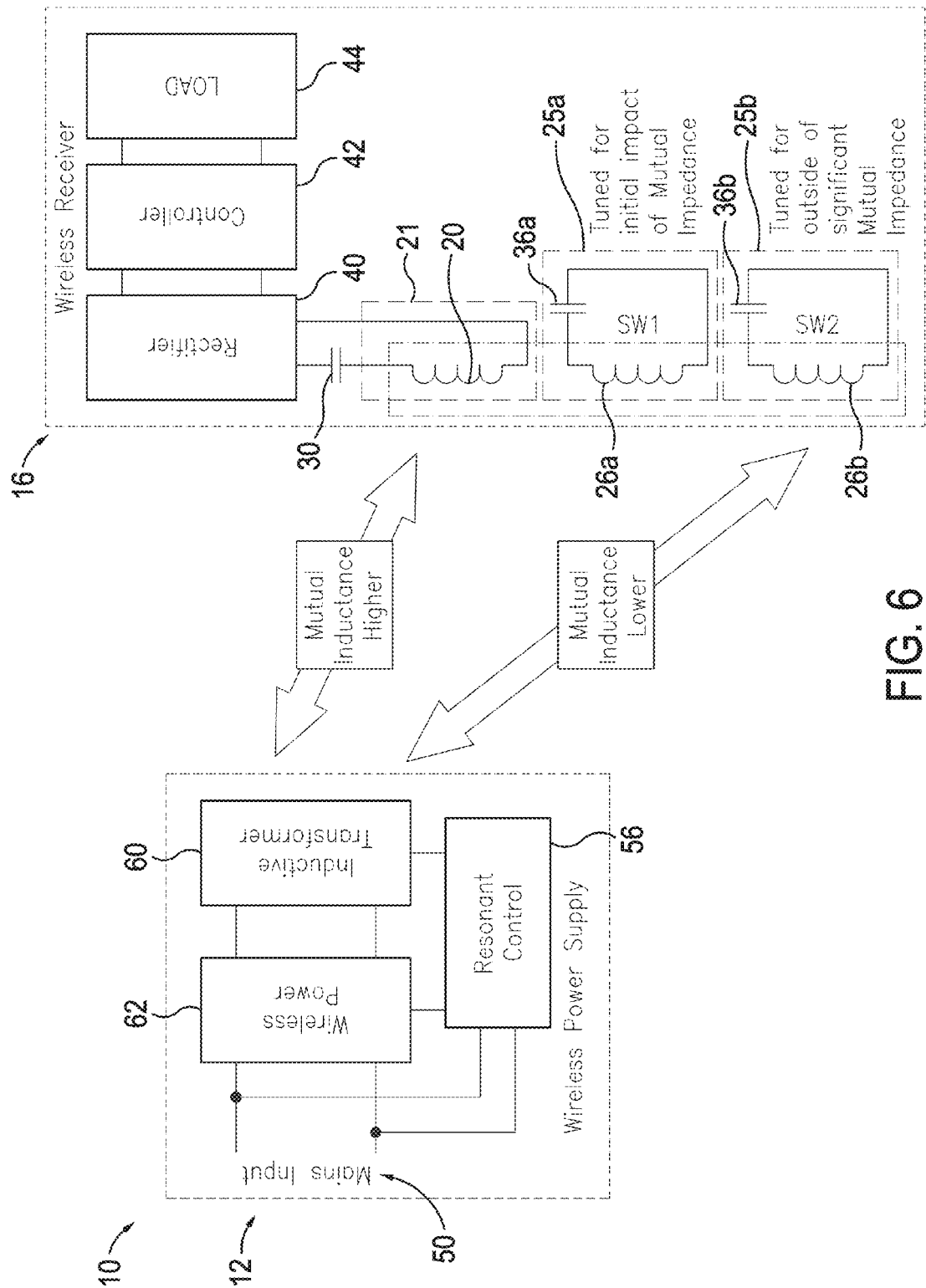
FIG. 6 is a representative view of one embodiment of the wireless power system with coil configurations.
Figure 7:
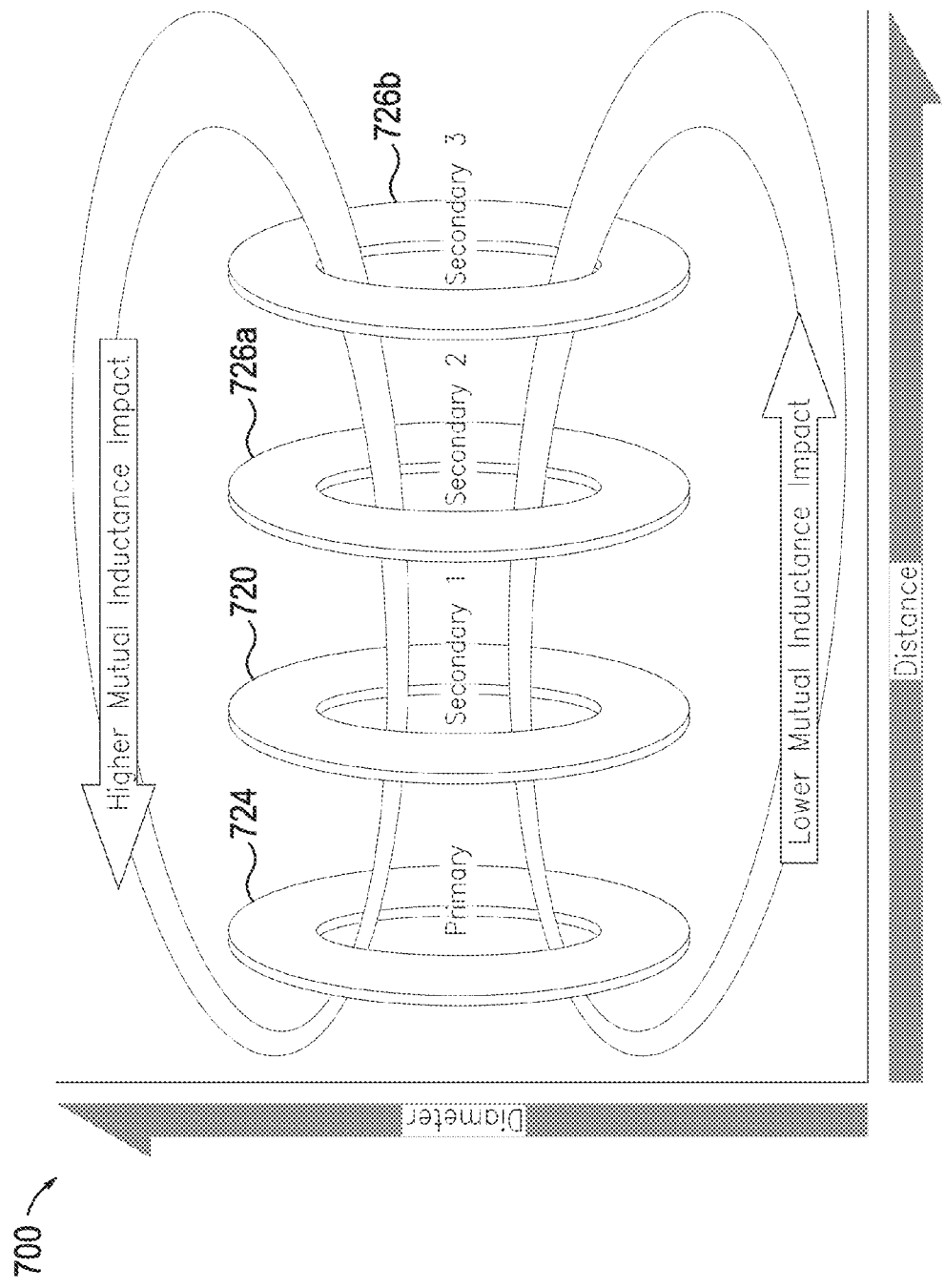
FIG. 7 is the effect that secondary coils may have on mutual inductance.

FIGS. 6-7 show the effect that the secondary tank circuit 21 and plurality of resonating circuits 25a-b may have on the mutual inductance of the wireless power supply system. As the distance between the receiver unit 16 relative to the primary unit 12 increases, the affect on mutual inductance decreases. As a result, the secondary tank circuit 21 or one of the plurality of resonating circuits 25a-b may be more appropriately configured to efficiently transfer power at a particular distance. The distances where the secondary tank circuit 21 or each of the resonating circuits 25a-b are appropriately configured to transfer power may overlap at some distances, and there may be more than one configuration for a particular distance.

As an example, the secondary tank coil 720 or one of the plurality of resonating tank coils 726a-b may be more appropriately configured to efficiently transfer power at a particular distance. In the current embodiment, when the receiver unit 16 is closer to the primary unit 12, it may have a greater affect on mutual inductance. Accordingly, the secondary tank circuit 21 may be configured to receive power efficiently at these closer distances. When the receiver unit 16 is at an intermediate distance relative to the primary unit 12, it may have a lesser impact on mutual inductance or a materially reduced impact on mutual inductance. In these circumstances, for example, the resonating circuit 26a may be configured to receive power efficiently at this intermediate distance. As another example, when the receiver unit 16 is at an even greater distance from the primary unit 12 than the previous examples, the affect on mutual inductance may be insignificant. Accordingly, the resonating circuit 26b may be configured to receive power efficiently at this distance.

Figure 8:
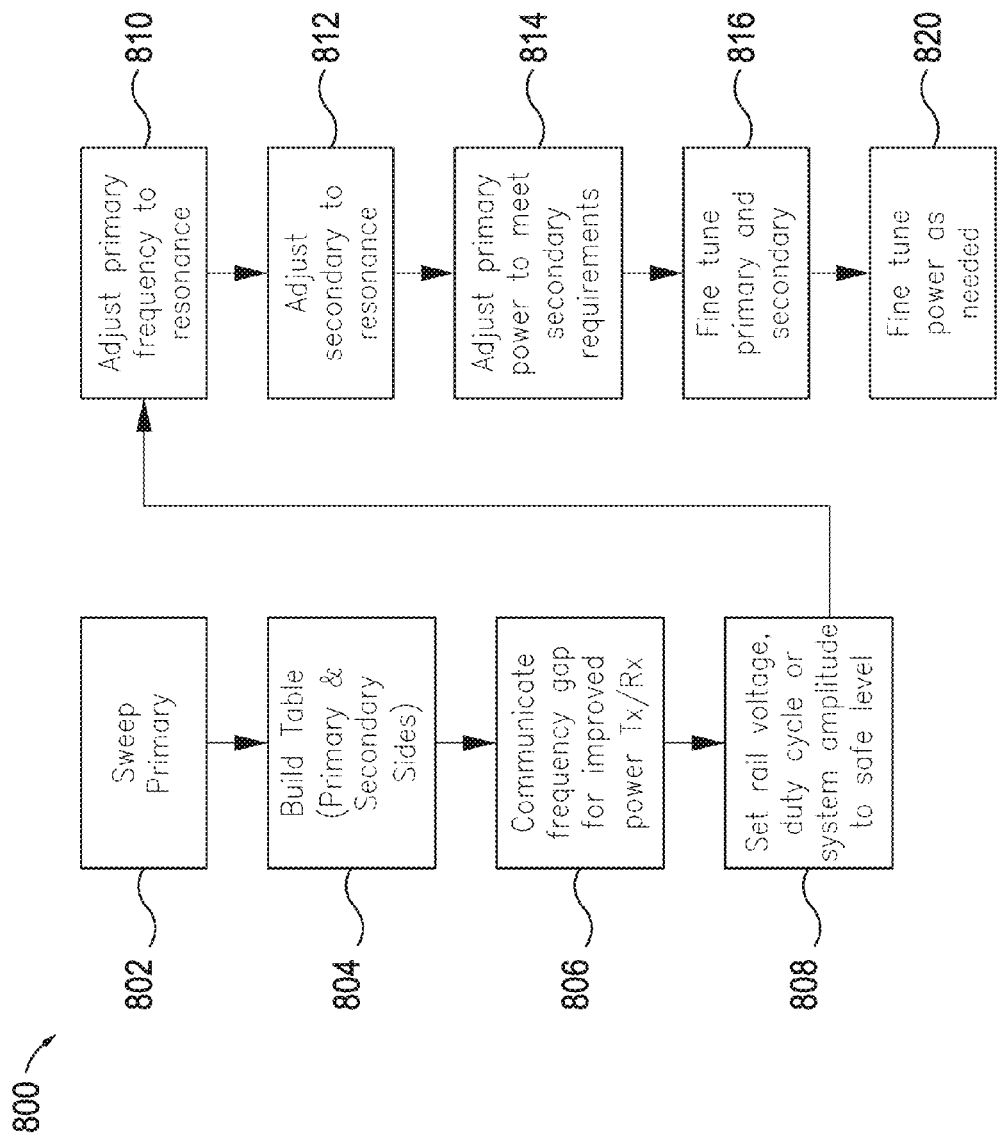
FIG. 8 is a flow chart showing one method for operating one embodiment of the wireless power system with coil configurations.
Figure 9:
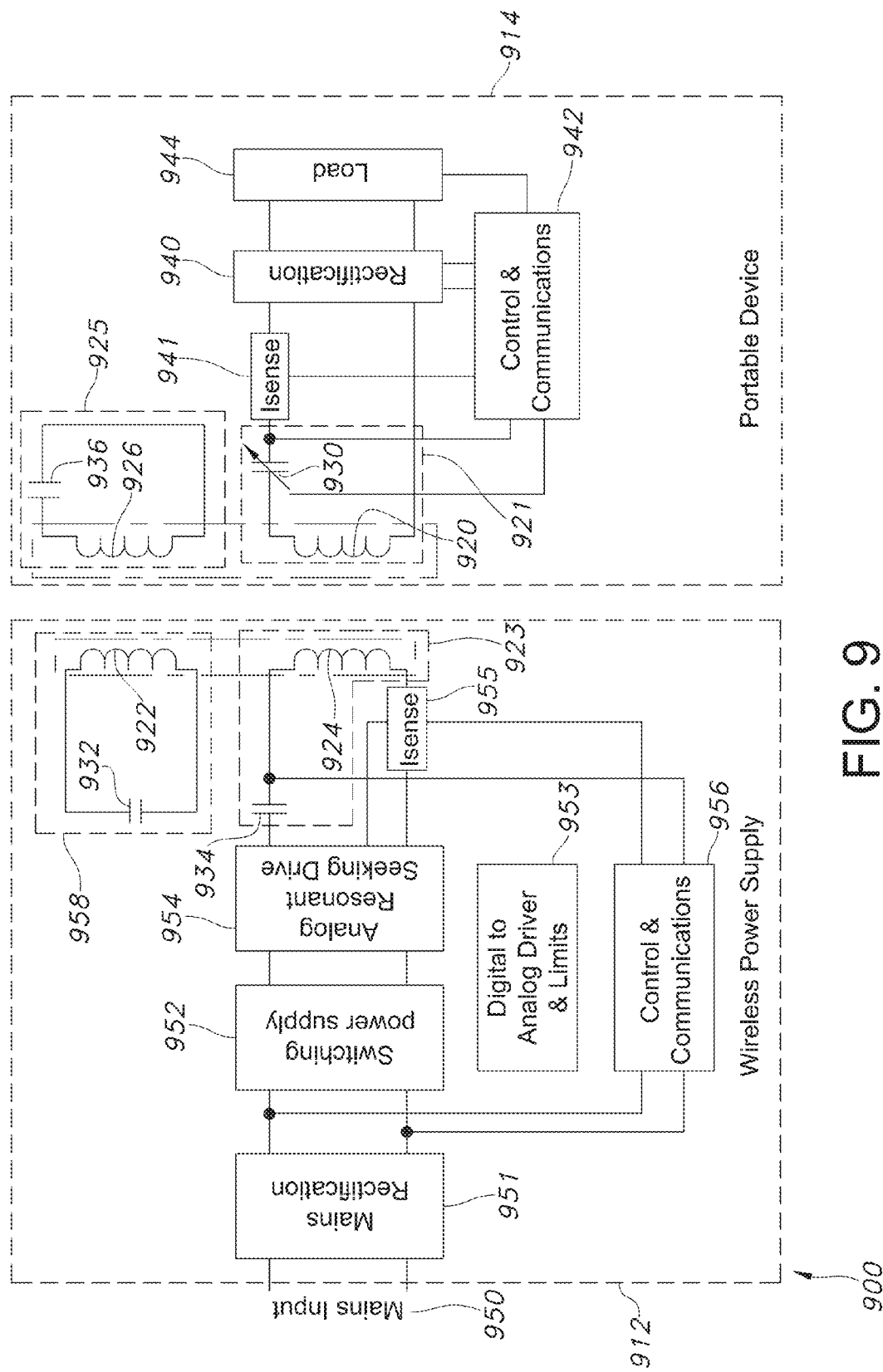
FIG. 9 is a representative view of one embodiment of the wireless power system with coil configurations.

FIG. 8 shows one embodiment of a method for operating the wireless power supply system. FIG. 9 shows a wireless power supply system that is described with reference to FIG. 8 because it includes components that may facilitate describing the method shown in FIG. 8. More specifically, FIG. 9 shows a wireless power supply system 900 that includes a primary unit 912 and a portable device 914 with receiver unit circuitry. The wireless power supply system 900 may include a primary current sensor 955 and a secondary current sensor 941 to measure current through the primary tank circuit 923 and secondary tank circuit 921, respectively. Further, the primary unit 912 and portable device 914 may communicate information, such as measured current or device identification information to each other. The primary unit 912 may include D-to-A Driver and Limiter 953, which may receive commands from the control and communications circuitry 956 and send them in usable form to the power supply 952 and analog resonant seeking drive circuitry 954. The D-to-A Driver and Limiter may also include circuitry for preventing unsafe system amplitude from occurring between the primary unit 912 and the portable device 914. As described in previous embodiments, the primary unit 912 may control at least one of the rail voltage, duty cycle, operating frequency, or a combination of the three, and the portable device 914 may control the resonant frequency of the secondary tank coil 920 and variable secondary tank capacitor 930. It should be understood that any of the components shown in FIG. 9 may be included in the previously described embodiments, and that embodiments previously described may implement the method of operation shown in FIG. 8.

The method of tuning shown in FIG. 8 may include measuring an operating characteristic in the primary unit 912 and the receiver unit, such as operating frequency. The wireless power system may compare these operating characteristics to determine if tuning the primary unit 912 or the receiver unit may provide for improved power transfer efficiency. In the current embodiment, the primary unit 912 may sweep the operating frequency of the primary resonating coil 922. Step 802. In alternative embodiments where a primary resonating coil 922 is not used, the primary unit 912 may sweep the operating frequency with respect to a primary coil 924. During the sweeping operation, the wireless power supply system 900 may create a table of measurements made in the primary unit 912 and portable device 914. Step 804. These measurements may include primary current sensor 955, secondary current sensor 941, or another measurement indicative of the status of the primary unit 912 or receiver unit during the frequency sweep. The primary unit 912 and receiver unit may communicate their tabulated data to each other so that a frequency gap may be determined. The tabulated data may allow a detailed representation of the resonant frequencies or peaks measured in the primary unit 912 and receiver unit and the various gaps between these resonant frequencies or peaks. There may be multiple resonant frequencies or peaks depending on the configuration of the primary tank circuit 923, primary resonating circuit 958, secondary tank circuit 921, and resonating circuit 925. As described in other embodiments, the current embodiment may include more than one resonating circuit 925. The frequency gap is the difference or differences between resonant frequencies or peaks measured at the primary unit 912 and resonant frequencies or peaks measured at the receiver unit. A comparison between these resonant conditions may provide a way to reconcile measured characteristics and adjust operating parameters to improve power transfer efficiency. Once the frequency gap is determined, the primary unit 912 and portable device 914 may determine operating parameters for improved power transfer efficiency, such as the desired resonant frequency of the secondary tank circuit 921. Step 806. The wireless power supply system 900 may also determine the desired resonant frequency of the resonating circuit 925 located within the receiver unit and the desired resonant frequency of the primary tank circuit 923. The primary unit 912 may then adjust at least one of rail voltage, duty cycle, and operating frequency to provide power to the receiver unit. These adjustments may be made to maintain the system amplitude within a safe level to prevent components from being damaged. Steps 808 and 810. In alternative embodiments, the primary unit may make adjustments to provide power efficiently to the portable device based on the affect the portable device has on mutual inductance. In another alternative embodiment, the portable device 914 may also adjust the variable secondary tank capacitor 930 to achieve a desired resonant frequency change determined in step 806. In the current embodiment, the primary unit 912 may now adjust the amount of power delivered to the portable device 914, which may depend on the load 944 of the portable device 914. Step 814.

The wireless power supply system 900 may adjust operating parameters for achieving improved power transfer efficiency and providing an appropriate amount of power to the portable device 914. As a result, a combination of the above described steps may be iterative so that the wireless power supply system 900 may continually improve power transfer efficiency. For example, if conditions such as the proximity of the portable device 914 relative to the primary unit 912 change, the wireless power supply system 900 may adjust to provide improved power transfer efficiency to the portable device 914.

The methods of tuning described may be used simultaneously with respect to the primary tank circuit 923, primary resonating circuit 958, secondary tank circuit 921, and the resonating circuit 925 to determine appropriate operating parameters and select suitable inductive coupling between 1) the primary coil 924 and the primary resonating coil 922 and 2) the secondary coil 920 and the resonating circuit 925. For example, secondary current sensor 941 and primary current sensor 955 may respectively measure current in the primary tank circuit 923 and the secondary tank circuit 921 during a frequency sweep. The frequency response measured at the primary unit 912 may be affected by inductive coupling, which may depend on the configuration of each of the primary tank circuit 923, primary resonating tank circuit 958, secondary tank circuit 921, and resonating circuit 925. Additionally, the frequency response measured at the receiver unit may also be affected by inductive coupling, which may depend on the configuration of each of the primary tank circuit 923, primary resonating tank circuit 958, secondary tank circuit 921, and resonating circuit 925. The frequency response curves from the primary unit 912 and receiver unit may then be compared to adjust the wireless power supply system 900 for improved power transfer efficiency at a particular distance between the primary unit 912 and the receiver unit. Alternatively, sensors may be associated with each of the primary tank circuit 923, primary resonating circuit 958, secondary tank circuit 921, and resonating tank circuit 925. The characteristics measured with respect to each sensor may be compared with each other to adjust the wireless power supply system 900 for improved power transfer efficiency. Further, the described methods for tuning are not limited to measuring current as an operating characteristic. The methods for tuning may include measuring voltage, phase, or a combination of different operating characteristics.

Additionally, the methods for tuning described may be used iteratively to improve power transfer efficiency. The frequency sweep and comparison may be performed at any time during operation to determine if power transfer efficiency may be improved or adjusted. Further, the frequency sweep may be performed with respect to the primary tank circuit 923 and one or more of the secondary tank circuit 921 and resonating circuit 925. Adjustments may be made after a comparison between the frequency response of the primary tank circuit 923 and one or more of the secondary tank circuit 921 and resonating circuit 925. The frequency sweep and adjustments may be performed again with respect to the primary tank circuit 923 and the same or a different set of the secondary tank circuit 921 and resonating circuit 925. As a result, power transfer efficiency between the primary unit 912 and the receiver unit may be continuously improved.

Figure 10:
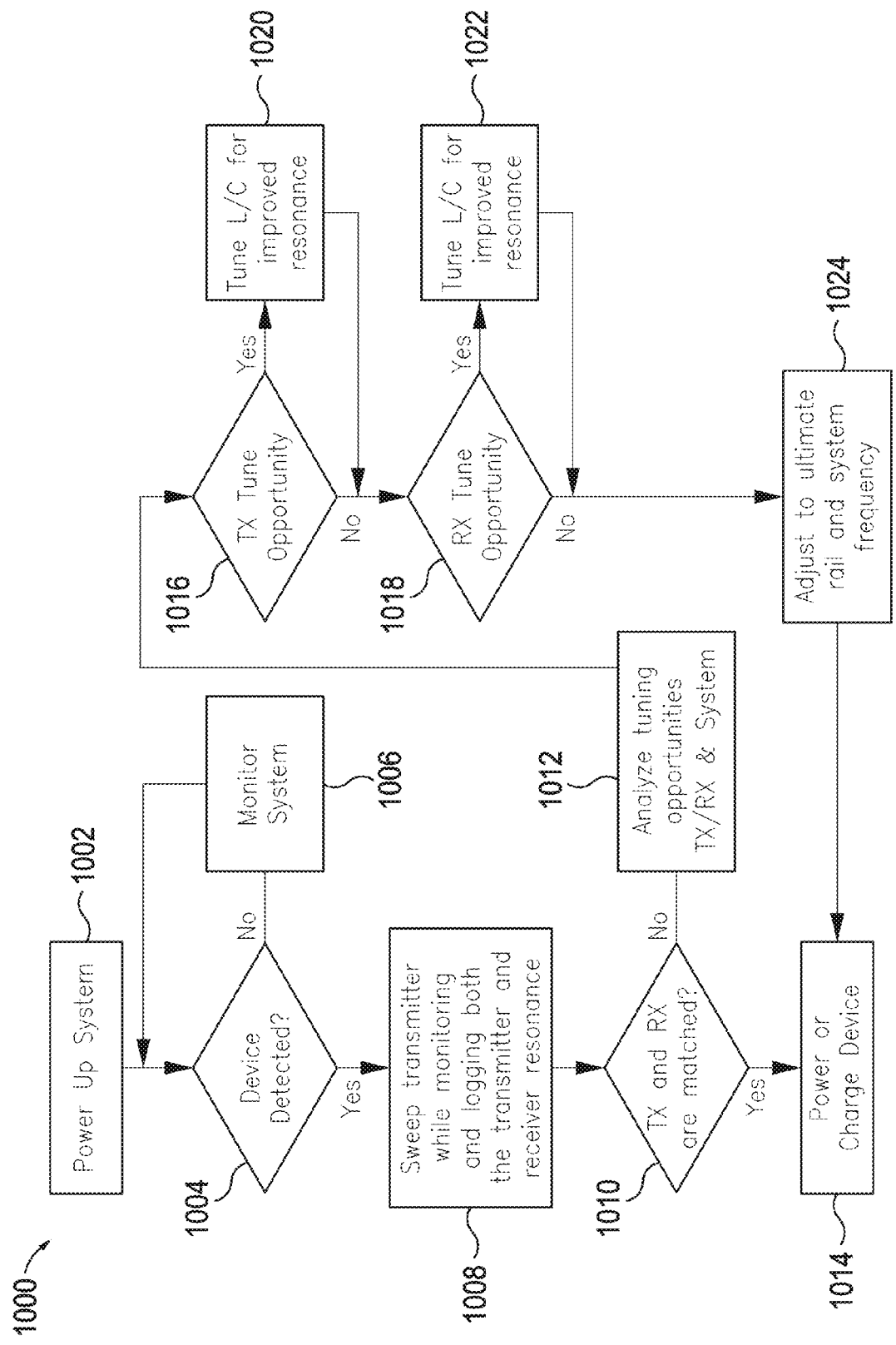
FIG. 10 is a flow chart showing one method for operating one embodiment of the wireless power system with coil configurations.

Referring now to FIG. 10, one embodiment of a method for operating the wireless power supply system is shown. This method may allow the wireless power system to have the primary unit and receiver unit communicate with each other to coordinate dynamic resonant frequency matching. At power up, the wireless power supply system begins monitoring for presence of a receiver unit. Step 1002. Presence detection may be achieved using techniques such as pinging, load detection, or communications. If no receiver unit is detected the system may continue to monitor for presence of a receiver unit. Steps 1004 and 1006. Once a receiver unit is detected, the wireless power supply system may sweep the power transmission frequency range of the primary unit. During the frequency sweep, the primary unit and receiver unit may each make multiple measurements of the wireless power supply system, such as current through the primary tank circuit and secondary tank circuit at different frequencies. Step 1008. Using these measurements, the wireless power supply system may determine if the primary unit and receiver unit are substantially matched for efficient power transfer. Step 1010. If the two are substantially matched, then the wireless power supply system may begin providing power to the receiver unit. Step 1014. If the two are not substantially matched, then there may be an opportunity to tune the primary unit or the receiver unit to achieve improved power transfer efficiency. If there is an opportunity to tune, the wireless power supply may adjust at least one of the primary unit resonance or the receiver unit resonance. Steps 1012, 1016, 1018, 1020, 1022. Tuning may be achieved by using at least one of a variable inductor, variable capacitor, and selecting from a plurality of resonating coils depending on the receiver unit's affect on mutual inductance. The primary unit may begin providing the appropriate amount of power to the receiver unit and may adjust one or more operating parameters, such as operating frequency, duty cycle, or rail voltage. Step 1024.

Figure 11:
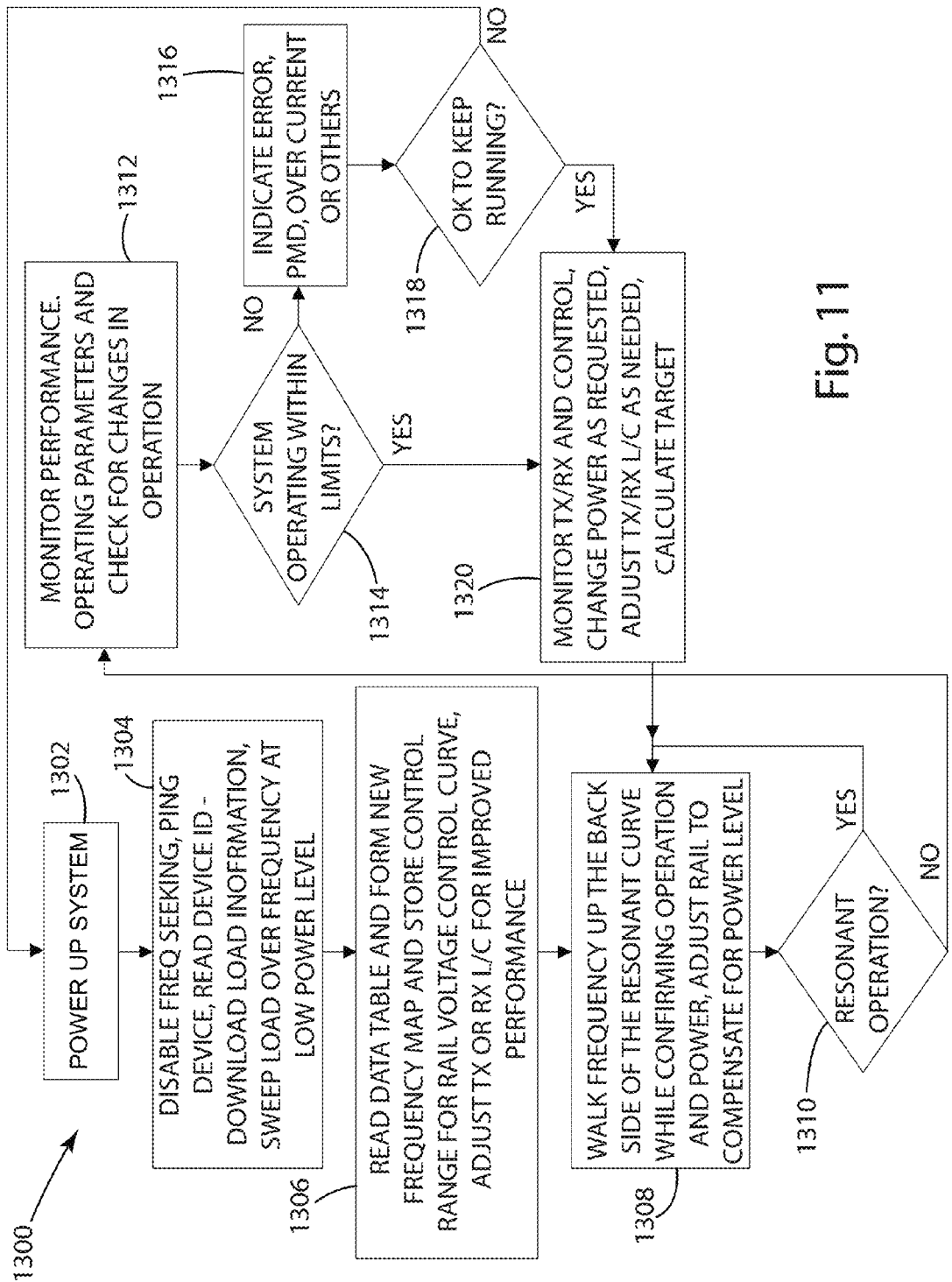
FIG. 11 is a flow chart showing one method for operating one embodiment of the wireless power system with coil configurations.

FIG. 11 shows one embodiment of a method for use with an adaptive wireless power supply system. This method may allow the wireless power supply system to adjust the frequency and rail voltage to achieve efficient power transfer between the primary unit and receiver unit. In alternative embodiments, the wireless power supply system may adjust another operating parameter, such as duty cycle, alone or in combination with the rail voltage and/or operating frequency.

At initialization, the primary unit may disable a frequency seeking operation, which may be used to seek an appropriate frequency for a given load. Step 1302. The primary unit may also ping for a presence of a portable device, read the portable device's ID through communication, and download load information for that particular portable device. In alternative embodiments, the portable device's ID may be enough information for the primary unit to determine the load information for that particular portable device. In the current embodiment, the load information may include the impedance of the load and the receiver unit's power receiving characteristics, such as the resonant frequency or frequencies of the receiver unit. The primary unit may sweep operating frequency at a low power level to determine the frequency response of the primary unit and receiver unit. Step 1304. Both the primary unit and receiver unit may include sensors for measuring the frequency response and placing the data into separate data tables. The primary unit or the receiver unit may read the data table from memory and determine a frequency map that may be used to calculate a control algorithm for transferring power from the primary unit to the receiver unit. The frequency map may include relationships between the resonant frequencies or peaks measured at the primary unit and the receiver unit, where properties of the coils and resonating circuits in the primary unit and the receiver unit may affect the frequency map. The primary unit, receiver unit, or both may adjust their resonant frequencies to achieve improved performance. Step 1306. For example, the receiver unit may adjust the resonant frequency of the secondary tank circuit or the resonant frequency of at least one of the plurality of resonating circuits. In this example, an appropriate configuration of inductor and capacitor may be selected to achieve improved power transfer efficiency.

The primary unit may begin providing the appropriate amount of power to the receiver unit and may adjust one or more operating parameters, such as operating frequency, duty cycle, or rail voltage. Step 1308.

The wireless power supply system may continue to monitor operation of the primary unit and receiver unit to determine if they are operating at resonance. If there are no changes, then the wireless power supply system may continue operation. Step 1310. If the wireless power supply system detects a change, then it may begin monitoring performance, monitoring operating characteristics, and check for changes in the operation and power transfer efficiency. Step 1312. If the wireless power supply system determines that the system is operating within normal limits, then it may perform steps similar to steps 1304 and 1306 described above. Accordingly, the wireless power supply system may monitor or measure operating characteristics of the primary unit and receiver unit, such as the current through the primary tank coil, secondary tank coil, or both. The resonant frequency of the primary unit, receiver unit, or both may be adjusted based on the observations of the primary unit and receiver unit operating characteristics. Also, control of the system may be adjusted based on changes in resonant frequencies or the measurements made regarding the operating characteristics of the primary unit and the receiver unit. Step 1320. At this point, the system may begin operation as described before with regard to step 1308.

If the wireless power supply system determines that the system is not operating within normal limits, a fault condition may be present. Fault conditions such as operational errors, parasitic metal, over current, or other error conditions may be detected and cause the wireless power supply system to shut down until the fault condition is fixed. Steps 1316 and 1318. If a fault condition is not present, then the system may begin operation as described before with regard to step 1320.

Figure 12:
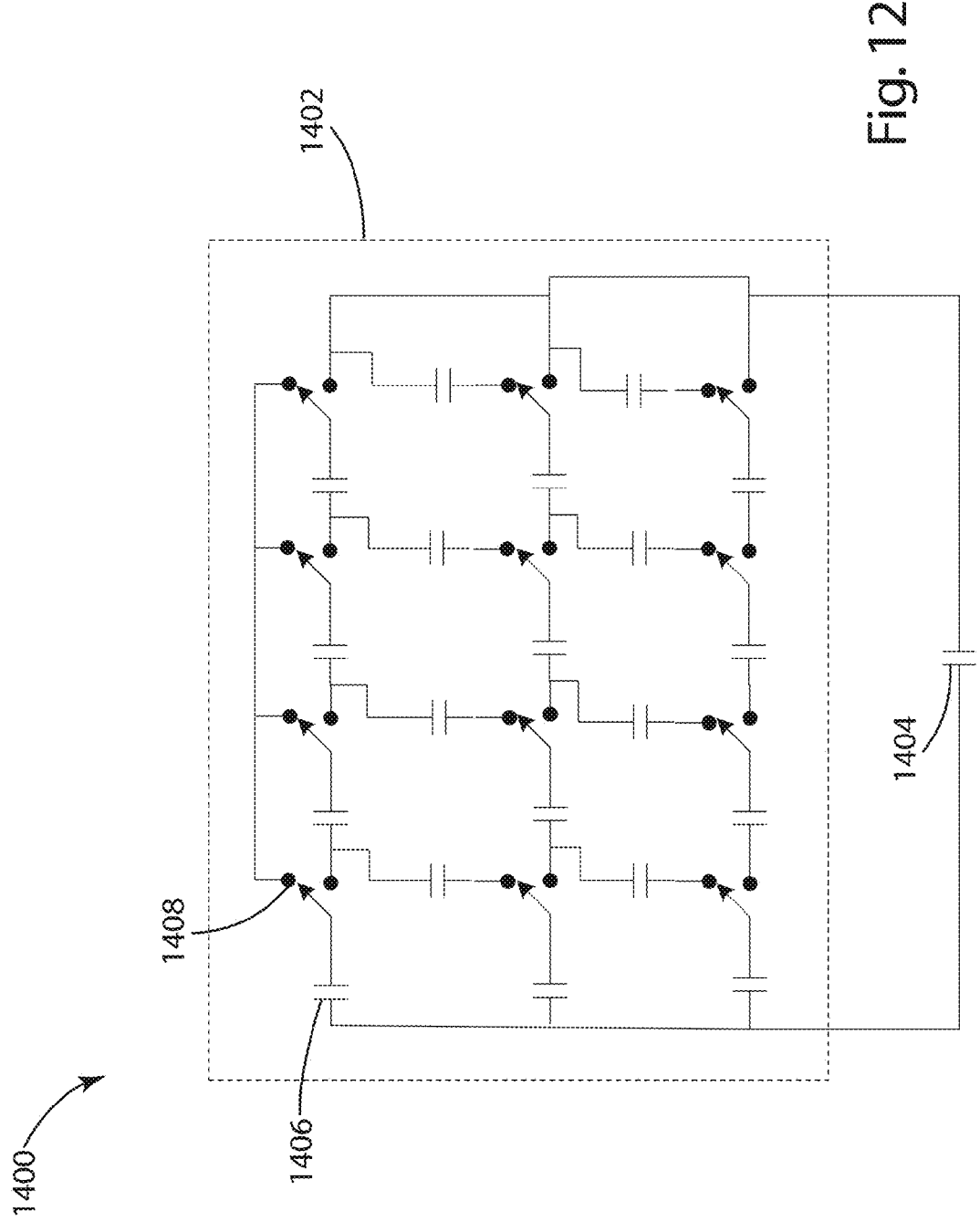
FIG. 12 illustrates a representative schematic of one embodiment of a tuning capacitor network.
Figure 13:
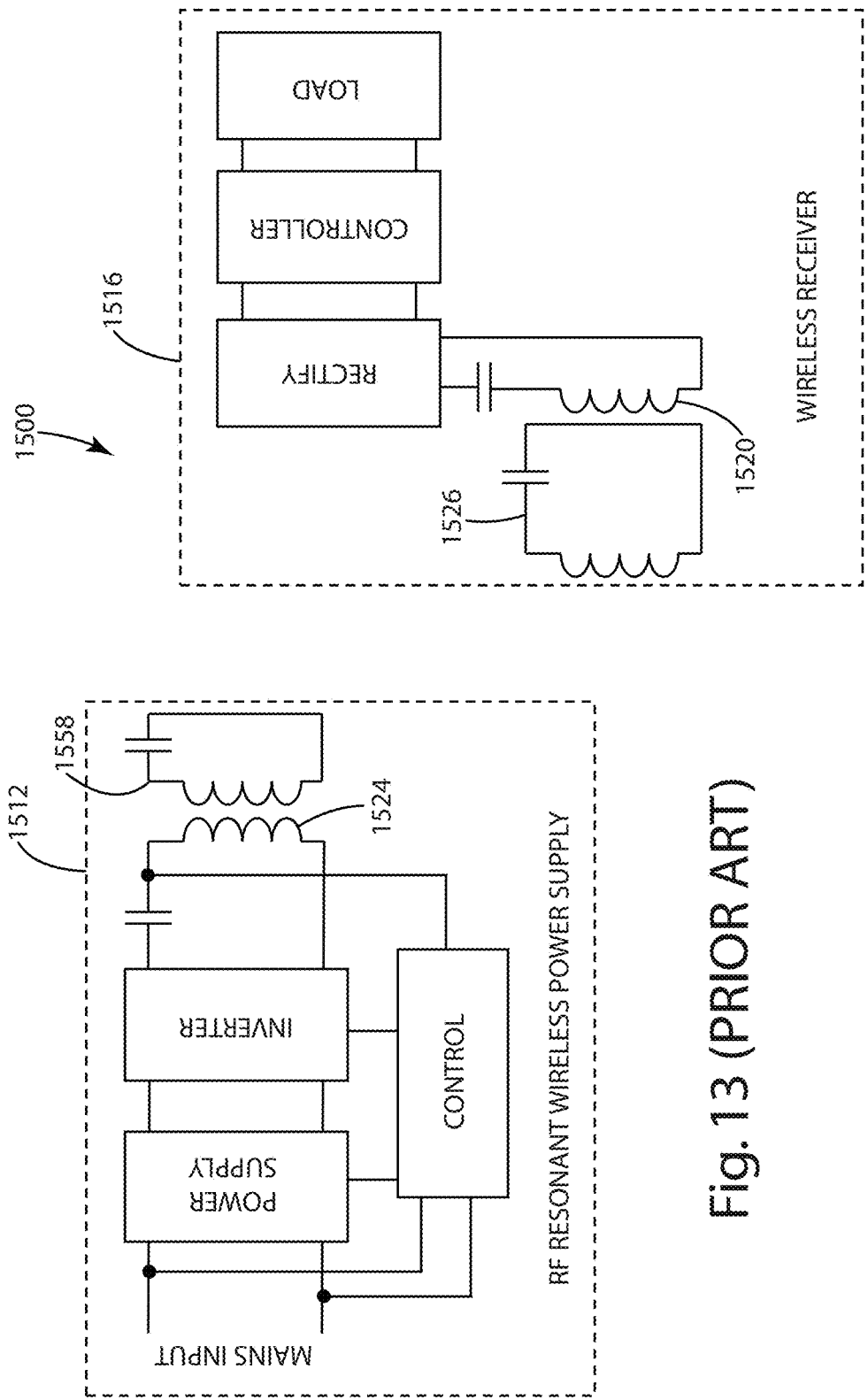
FIG. 13 is a representative view of a prior art wireless power system in which the primary unit and the receiver unit each include an integrated resonating circuit.

As shown in FIG. 12, an embodiment of a variable capacitor network 1402 is shown. The variable capacitor network 1402 may be a series and parallel network formed using micro-electro-mechanical systems (MEMS) or an application specific integrated chip (ASIC). The variable capacitor network 1402 may include a plurality of tuning capacitors 1406 and a plurality switches 1408. The plurality of switches 1408 may be utilized to select a combination of the plurality of tuning capacitors 1406 that produces a desired tuning network capacitance. For example, a controller (not shown) may turn on and off a combination of the plurality of switches 1408 to produce a desired capacitance. The base tuning capacitor 1404 may be used as a reference capacitance that the variable capacitor network 1402 may be combined with to produce a desired capacitance. The variable capacitor 1400 described above may be used in the various embodiments described above that include a variable capacitor.

As noted above, conventional wireless power systems are known to include resonating circuits in the both the primary unit and the receiver unit. For example, a representative illustration of a conventional wireless power system 1500 in shown in FIG. 13. As shown, the system 1500 may include primary unit 1512 and receiver unit 1516. The primary unit 1512 includes a primary coil 1524 and a resonating circuit 1558. Similarly, the receiver unit 1516 includes a secondary coil 1520 and a resonating circuit 1526. In this embodiment, the resonating circuit 1558 in the primary unit 1512 and the resonating circuit 1526 in the receiver unit 1516 are integrated or otherwise built into their respective assemblies. As such, they always remain part of the overall system 1500 regardless of variations in system parameters, such as changes in the number, position, orientation and power needs of the portable device. As discussed above, the presence of resonating circuits is not always advantageous. For example, in some application, resonating circuits can hamper efficient power transfer when there is relatively close alignment between the primary unit 1512 and the receiver unit 1516.

Figure 14:
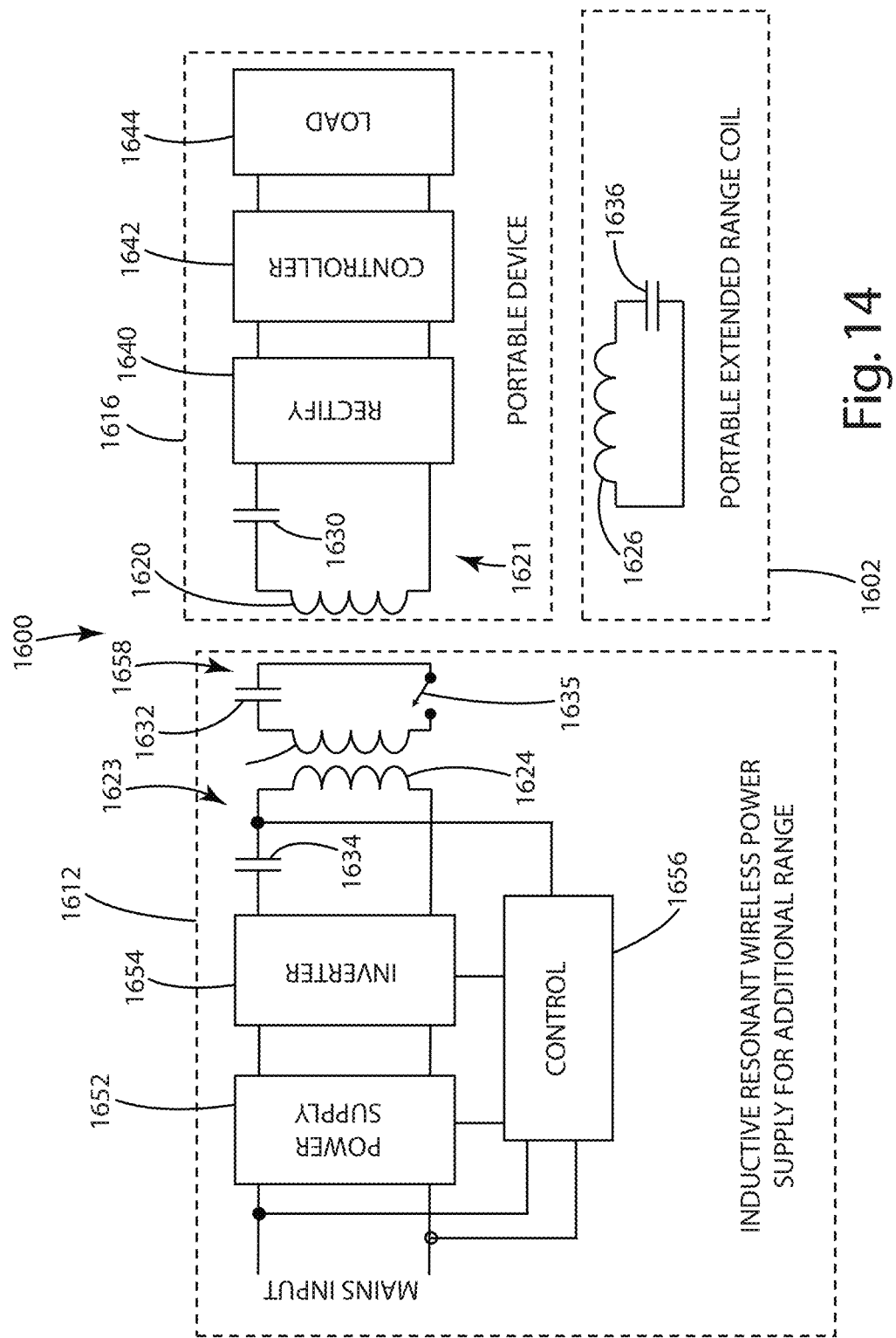
FIG. 14 is a representative view of an alternative wireless power system in which the receiver resonating circuit is separated from the portable device.

In an alternative embodiment of the present invention, the wireless power system includes a resonating circuit that is separate from the primary unit and the portable device, which allows the resonating circuit to be used only when desired. In the embodiment of FIG. 14, the wireless power system 1600 generally includes a primary unit 1612, a receiver unit 1616 and a resonating circuit 1602 that is separate from the receiver unit 1616. In this embodiment, the primary unit 1612 may generally include a power supply 1652, an inverter 1654, a primary tank circuit 1623, a primary resonating circuit 1658 and a control 1656. The primary tank circuit of this embodiment includes a primary coil 1624 and a capacitor 1634. Similarly, the primary resonating circuit 1658 of this embodiment includes a primary resonating coil 1622 and a capacitor 1632. The primary resonating circuit 1658 may also include a switch 1635 (as shown) that allows the primary resonating circuit 1658 to be effectively removed from the circuit, when desired. In use, the switch 1635 may be opened to remove the primary resonating circuit 1658 when it is desirable to charge or power a portable device in close proximity, such as when a portable device is placed directly on the primary unit 1612. The switch 1635 may be closed to enable the primary resonating circuit 1658 when the portable device will be charged at great distance, such as through a counter or table top. As such, the switch 1635 allows the primary unit 1612 to be used on or under a counter (or other support surface) just by operating the switch 1635. Although not shown, switch 1635 may, if desired, be incorporated into the primary resonating circuits of the embodiments shown in FIGS. 15, 16A and 16B. The primary unit 1612 may be provided with optional mounting brackets (not shown) that can be used to mount the primary unit 1612 under a surface. In this embodiment, the receiver unit 1616 generally includes a load 1644, a controller 1642, a rectifier 1640 and a secondary tank circuit 1621. The secondary tank circuit 1621 of this embodiment generally includes a secondary coil 1620 and a capacitor 1630. As can be seen, in this embodiment, the receiver unit 1616 does not include an integrated resonating circuit.

The separate resonating circuit 1602 of this embodiment generally includes a resonating coil 1626 and a resonating capacitor 1636. The separate resonating circuit 1602 may include alternative types of inductor and/or alternative forms of capacitance. For example, in some applications the resonating coil may be replaced by an inductor that is not a coil. As another example, the resonating coil may be configured in such a way as to have sufficient capacitance to eliminate the need for a separate capacitive element. The separate resonating circuit 1602 may be integrated into essentially any structure suitable for being disposed between the primary unit 1612 and the receiver unit 1616. For example, if the primary unit 1612 is integrated into a table top, the separate resonating circuit 1602 may be integrated into a coaster, a pad, a placemat, a trivet or other similar structure that is removably placeable on the table top as desired. The structure containing the separate resonating circuit 1602 may have a bottom surface configured to rest properly on the power transfer surface and a top surface configured to support the portable device. For example, the bottom surface may be covered by a scratch resistant material and the top surface may be contoured to receive the portable device. Contours or other indicia in or on the top surface may assist in positioning the portable device. In operation, it is possible to use the separate resonating circuit 1602 only when beneficial to operation. For example, if the user intends to position the portable device so that the receiver unit 1616 in close alignment with the primary unit 1612, the separate resonating circuit 1602 may not be used. In such case, the portable device can be placed directly on the table top or other power transfer surface. On the other hand, if the user positions the portable device a greater distance from the primary unit 1612, the separate resonating circuit 1602 may be positioned on the table top or other power transfer surface to improve power transfer efficiency. In cases where the separate resonating circuit 1602 is desired, the separate resonating circuit 1602 may be placed on the table top (or other power transfer surface) and the portable device may be placed on the separate resonating circuit 1602. A separate resonating circuit not only allows improved performance in application where spatial freedom exists, but it also allows the portable device to be more efficiently used with primary units that provide for close alignment, such as a primary unit with a charging cradle or other mechanism that provide close alignment.

Figure 15:
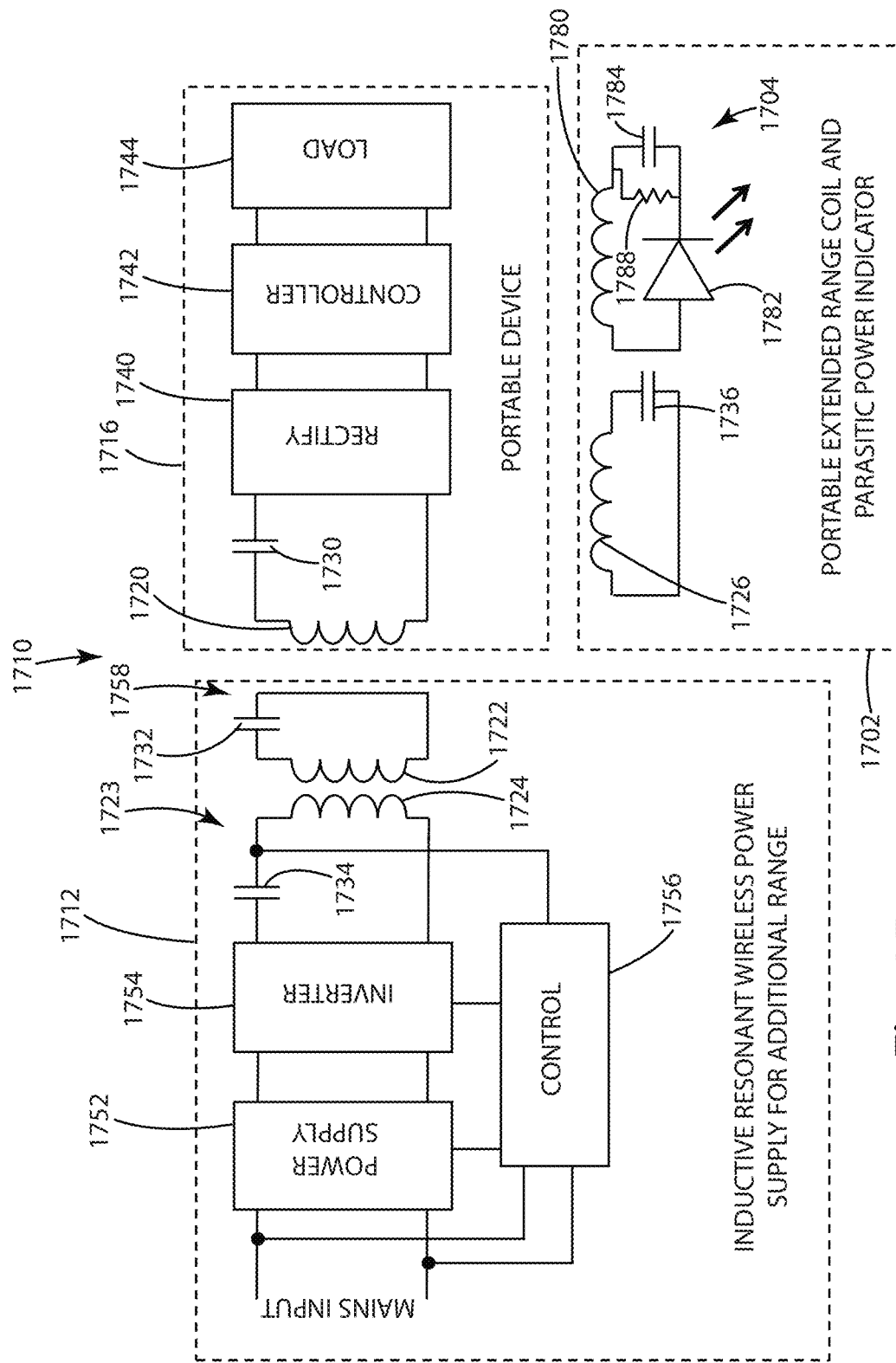
FIG. 15 is a representative view of an alternative wireless power system in which a separate receiver resonating circuit includes a parasitic power indicator.

An alternative wireless power supply 1710 having a separate resonating circuit 1702 is shown in FIG. 15. In this alternative embodiment, the separate resonating circuit 1702 includes a power indicator 1704. Referring now to FIG. 15, the primary unit 1712 may generally include a power supply 1752, an inverter 1754, a primary tank circuit 1723, a primary resonating circuit 1758 and a control 1756. The primary tank circuit of this embodiment includes a primary coil 1724 and a capacitor 1734. Similarly, the primary resonating circuit 1758 of this embodiment includes a primary resonating coil 1722 and a capacitor 1732. In this embodiment, the receiver unit 1716 generally includes a load 1744, a controller 1742, a rectifier 1740 and a secondary tank circuit 1721. The secondary tank circuit 1721 of this embodiment generally includes a secondary coil 1720 and a capacitor 1730. The receiver unit 1716 of this embodiment does not include an integrated resonating circuit. The separate resonating circuit 1702 of this embodiment includes not only a resonating coil 1726 and a resonating capacitor 1736, but also an additional circuit configured to provide a power indicator to signify when the separate resonating circuit 1702 is receiving power. In this embodiment, the power indicator circuit includes a parasitic coil 1780, a capacitor 1784 and a light source 1782, but the power indicator circuit may vary from application to application as desired to produce the desired power indicator. The power indicator circuit may in some applications also include a resistor 1788 in parallel with capacitor 1784. The resistor 1788 may provide a more consistent DC source in some applications. The illustrated light source 1782 is a light emitting diode (LED), but other types of light sources may be used. The light source 1782 may be partially disposed in an aperture in the housing or other structure containing the separate resonating circuit 1702 so that it is readily visible from the exterior of the structure. The power indicator 1704 may include additional or alternative indicators, such as audible, tactile or visual indicators. The power indicator circuit may be configured to produce sufficient power to illuminate the light source 1782 only when the separate resonating circuit 1702 is in the presence of an electromagnetic field of sufficient strength to provide power to the receiver unit 1716. For example, the characteristics of the parasitic coil 1780, capacitor 1784 and light source 1782 may be selected so that there is sufficient power to illuminate the light source 1782 only when the electromagnetic field is of sufficient strength to power the receiver unit 1716.

Figure 16A:
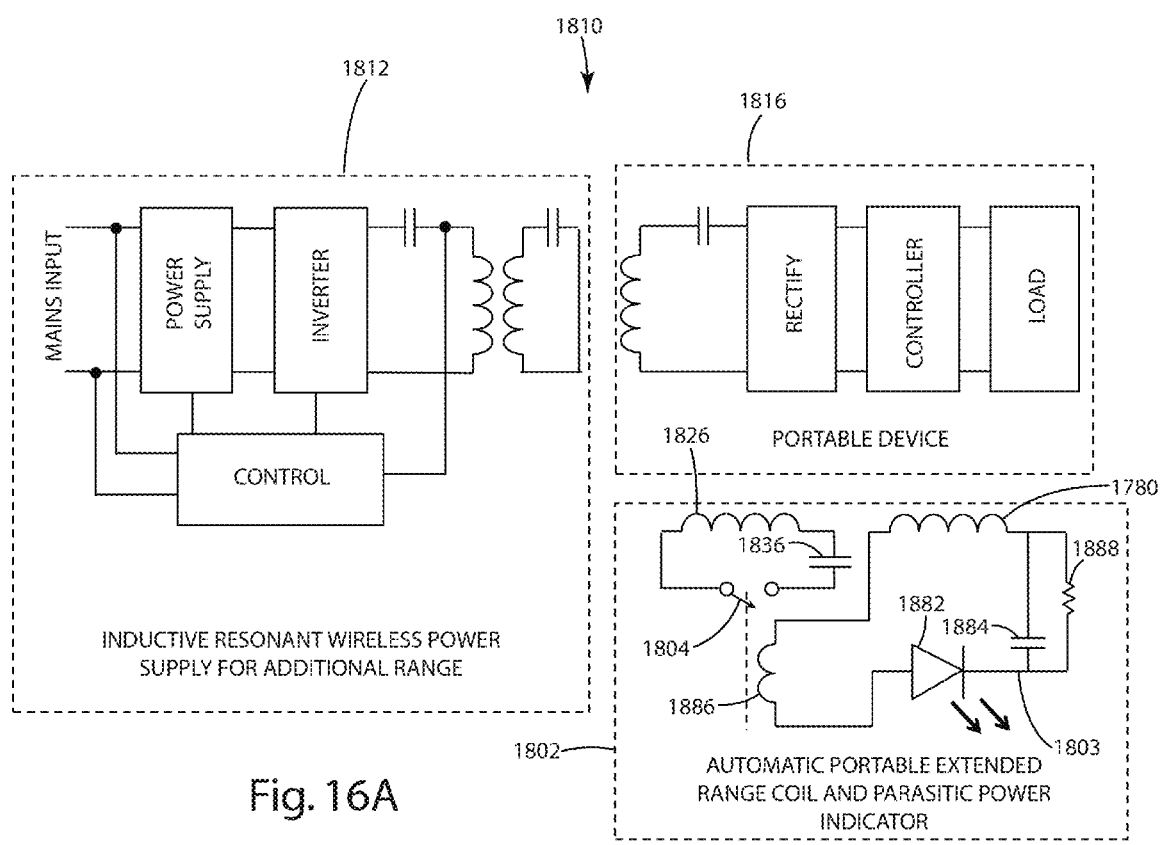
FIG. 16A is a representative view of an alternative wireless power system in which a separate receiver resonating circuit includes a parasitic power indicator and switch.

Another alternative embodiment of the present invention is shown in FIG. 16A. In this embodiment, separate resonating circuit 1802 is operatively coupled with an enable circuit 1803 capable of automatically engaging the resonating circuit 1802 under certain circumstances. As noted above, the presence of a resonating circuit can reduce efficiency of a wireless power transfer under certain operating conditions, such as when the receiver unit 1816 is closely aligned with the primary unit 1812. The enable circuit 1803 may be configured to enable the resonating circuit 1802 when the system 1810 is operating under conditions in which the resonating circuit 1802 will not reduce efficiency or otherwise negatively impact operation of the system 1800.

As shown in FIG. 16A, the separate resonating circuit 1802 includes a resonating coil 1826, a resonating capacitor 1836 and a switch 1804. In this embodiment, the switch 1804 is a reed switch or other type of switch that is actuated by a magnetic field. The switch 1804 of this embodiment is a "normally open" switch that closes when subjected to a sufficient magnetic field. The enable circuit 1803 includes a parasitic coil 1880, a capacitor 1884, an LED 1882, a resistor 1888 and an actuating coil 1886. Although optional, the resistor 1888 is arranged in parallel with capacitor 1884. When used, the resistor 1888 may provide a more consistent DC source. In operation, the switch 1804 is normally open, thereby causing the resonating circuit 1802 to be an open circuit that has little or no impact on the operation or performance of the wireless power supply system 1810. When subjected to an appropriate electromagnetic field, the parasitic coil 1880 produces power in the enable circuit 1803. In use, the LED 1882 can perform two functions. First, it can function as a power indicator by illuminating in the presence of power (as discussed above in connection with wireless power supply system 1700). Second, it can function as a simple rectifier to rectify the power induced in the parasitic coil 1880 to a DC bias voltage. The LED 1882 may be replaced by a simple diode or other rectifying component if an illuminating power indicator is not desired. When the DC bias voltage flows through the actuating coil 1886, it generates a magnetic field that operates the switch 1804 in the resonating circuit 1802. This closes the switch 1804, thereby closes the resonating circuit 1802. Once closed, the resonant circuit 1802 becomes an active and significant part of the wireless power supply system 1810 receiving power from the primary unit 1812, magnifying the oscillations and generating an electromagnetic field to transfer power to the receiver unit 1816.

The embodiment of FIG. 16A includes an enable circuit 1803 that is intend for use with a primary unit that varies operating frequency to adjust for operating condition changes, such as changes in the distance between the primary unit and the receiver unit. In this embodiment, the primary unit 1812 will generally operate at different operating frequencies when the receiver unit 1816 is at different distances from the primary unit 1812. For example, the primary unit 1812 may operate at 100 kHz when the primary unit 1812 and the receiver unit 1816 are as closely aligned as reasonably possible and may operate at 150 kHz or higher when the distance between the primary unit 1812 and the receiver unit 1816 is large enough that use of resonating circuit would benefit operation of the system 1810. In this case, the components and component values of the enable circuit 1803 may be selected so that the enable circuit 1803 produces enough power to enable the separate resonating circuit 1802 only when the wireless power supply is operating at or above of 150 kHz. For example, the component values of the parasitic coil 1880, capacitor 1884, LED 1882, resistor 1888 and actuating coil 1886 may be selected so that the enable circuit 1803 is only capable of generating enough power to actuate the switch 1804 when subject to an electromagnetic field at or above about 150 kHz. This may be achieved by selecting the component values so that the enable circuit 1803 becomes meaningfully resonant only at or above about 150 kHz. Although shown in the context of a "normally open" switch, the switch in the resonating circuit 1802 may be a "normally closed" switch. In such applications, the enable circuit 1803 may be reconfigured to function as a "disable" circuit. More specifically, the components and component values may be selected to generate a magnetic field sufficient to actuate the normally closed switch in the operating range (or ranges) in which it is not desirable for the resonating circuit 1802 to be present. In the above example, the disable circuit may be configured to generate sufficient power to actuate the normally closed switch when subject to power at an operating frequency range from about 100 kHz to about 150 kHz.

The present invention is not limited to use with primary units that use an operating frequency control scheme. In other applications, the primary unit may adjust for differences in the distance or orientation of the receiver unit using changes to other operating characteristics, such as resonant frequency, rail voltage and/or duty cycle. In such applications, the enable circuit may be configured to respond to these other operating characteristics rather than operating frequency.

Figure 16B:
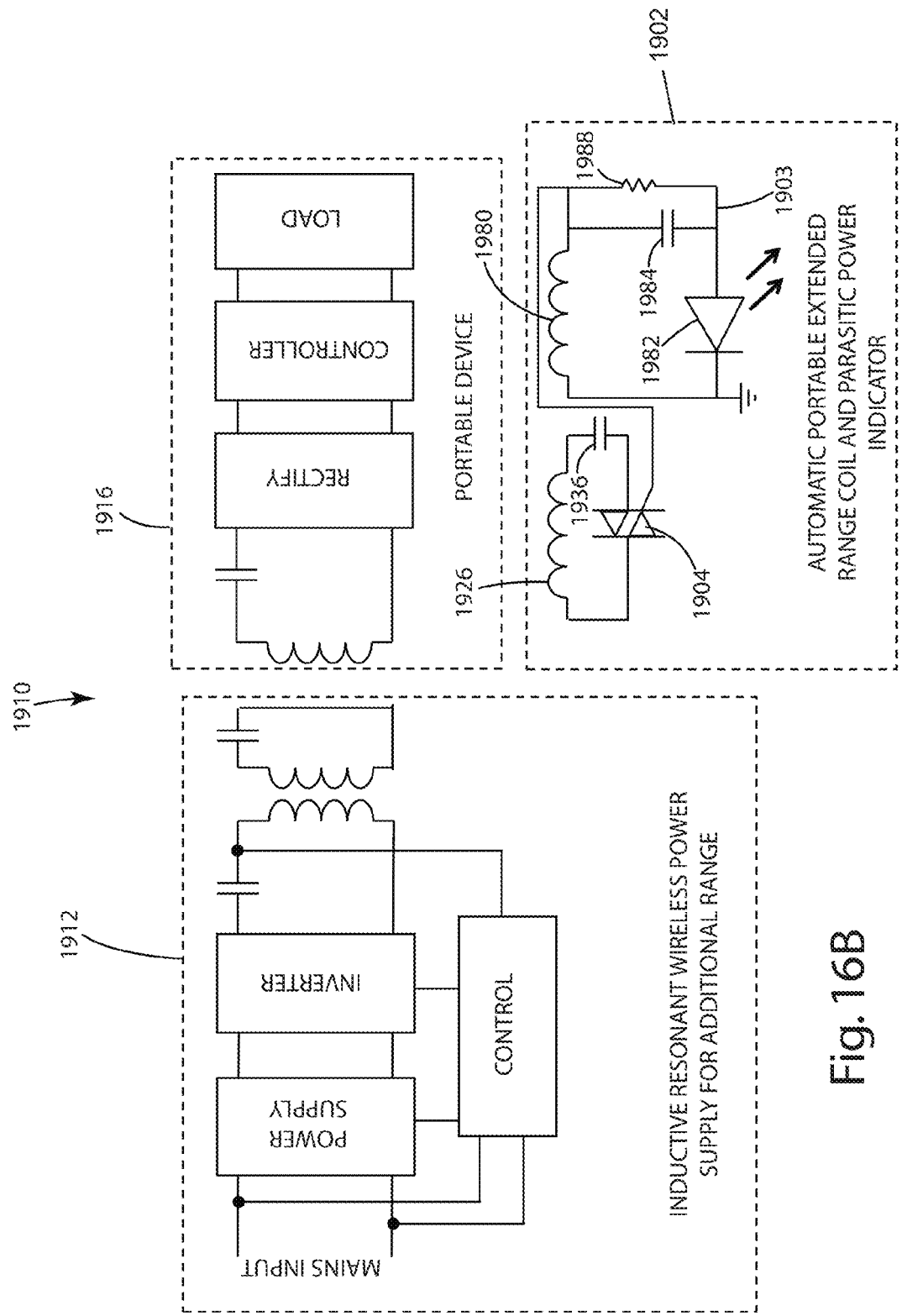
FIG. 16B is a representative view of an alternative wireless power system in which a separate receiver resonating circuit includes a parasitic power indicator and an alternative switch.

Although the resonating circuit 1802 and enable circuit 1803 are operatively coupled through interaction of the actuating coil 1886 and a reed switch 1804, the resonating circuit and enable circuit 1803 may be operatively coupled in other ways. For example, FIG. 16B shows an alternative embodiment in which the enable circuit 1903 is directly connected to a switching component in the resonating circuit 1902. In this embodiment, the switching component in the resonating circuit 1902 may be a triac 1904. The triac 1904 may include a pair of silicon controlled rectifiers as used in typical AC control applications. The enable circuit may be connected to the gate of the triac 1904 so that the triac 1904 is operated by power induced in the enable circuit. The components and component values of enable circuit 1903 may be selected so that the enable circuit 1903 produces sufficient power to actuate the triac 1904 only when the primary unit 1912 is operating within an operating frequency range in which it is desirable for the resonating circuit 1902 to be present. In some applications, the enable circuit and triac arrangement may be configured to provide proportional control of the flow of power within the separate resonant circuit 1902.

The various enable/disable circuits of the present invention are not limited for use in connection with a separate resonating circuit. To the contrary, one or more enable/disable circuits can be used in connection with any of previously discussed embodiments in which one or more resonating circuits are incorporated into the wireless power system. For example, an enable circuit can be coupled to any resonating circuit (on the primary side or the receiver side) when it is desirable for that circuit to be selectively and automatically disabled during certain operating conditions. In embodiments with multiple resonating circuits, each resonating circuit can be operatively coupled with a separate enable/disable circuit that is configured to enable/disable its associated resonating circuit as appropriate to limit any negative impact of the resonating circuit on efficiency or other operating characteristics.

Figure 17:
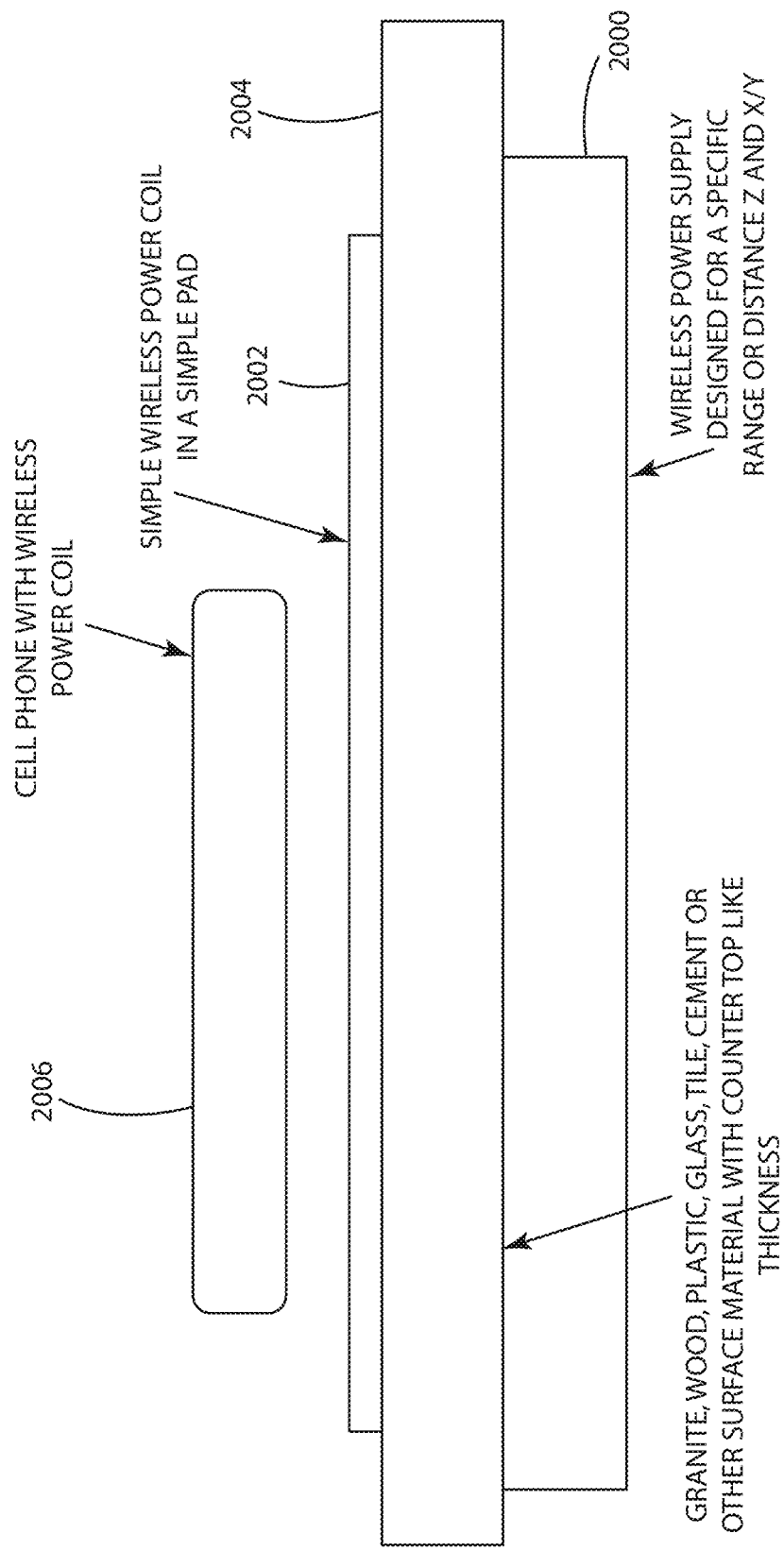
FIG. 17 is a representative view of an application of a wireless power system having a separate receiver resonating circuit.
Figure 18:
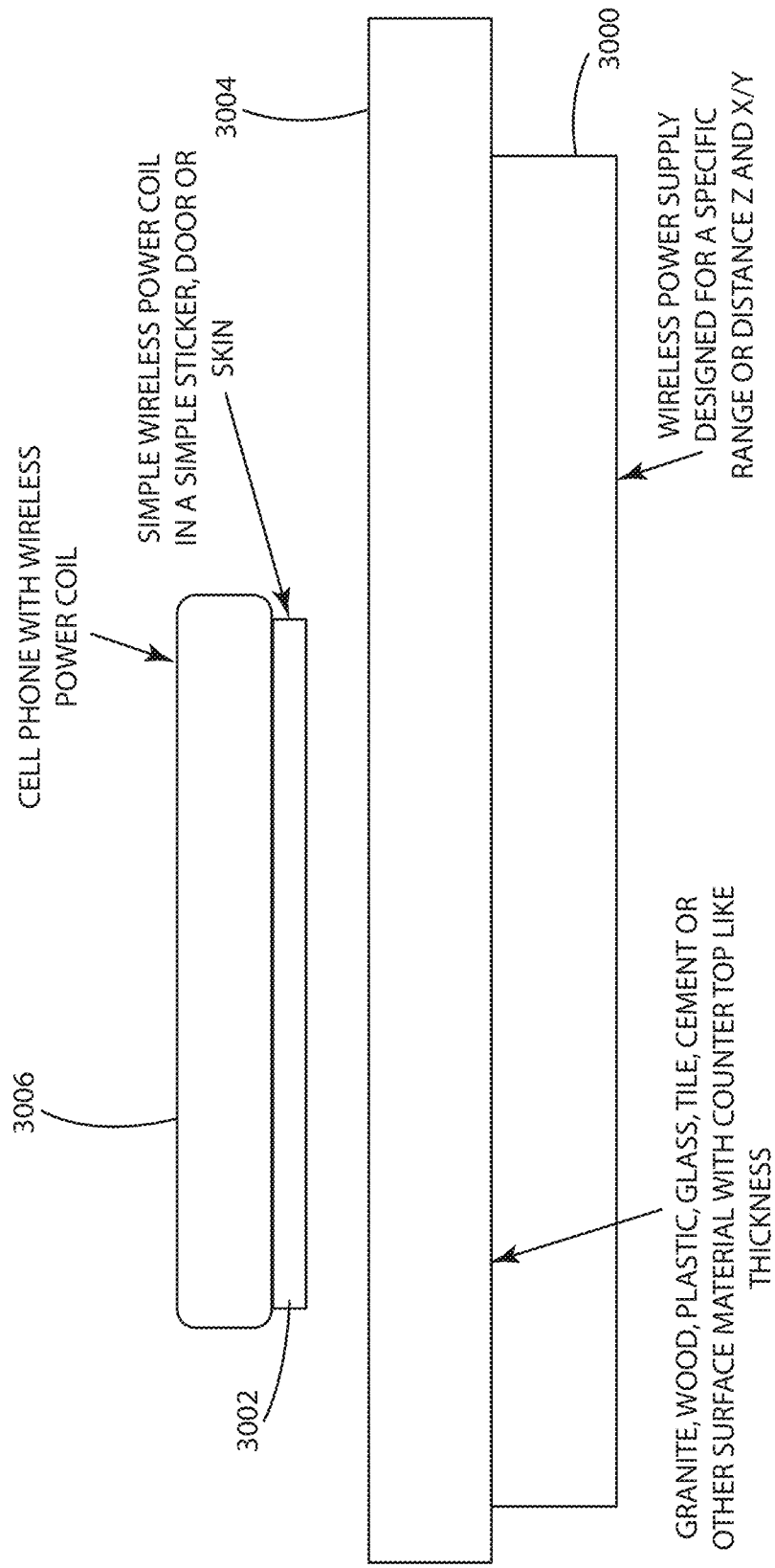
FIG. 18 is a representative view of a wireless power system having a separate receiver resonating circuit that is removably attachable to the portable device.

FIGS. 17 and 18 illustrate two examples of how a separate resonating coil might be implemented in different applications. Referring now to FIG. 17, the separate resonating coil may be incorporated into a pad 2002 that can be used with a wireless power supply 2000 incorporated into a counter top 2004, table top or other surface. In this embodiment, the counter top 2004 may be granite, wood, plastic, glass, tile, cement or another surface material with counter top-like thickness. The wireless power supply 2000 may be mounted to the undersurface of the counter top 2004. The pad 2002 may be separate from the wireless power supply 2000, the counter top 2004 and the portable device 2006 so that it can be placed on top of the counter top 2004 when desired. The pad 2002 may be configured to receive the portable device 2006, which may be a cell phone or other electronic device. With this application, the portable device 2006 may be placed directly on the surface of the counter top 2004 to receive power directly from the wireless power supply 2000. Alternatively, the pad 2002 with integrated resonating circuit can be placed on the surface of the counter top 2004 to perpetuate and amplify the electromagnetic field generated by the wireless power supply 2000. The portable device 2006 may be placed atop the pad 2002 where it will be within the perpetuated and amplified electromagnetic field generated by the resonating circuit contained within the pad 2002.

FIG. 18 shows an alternative embodiment in which the separate resonating circuit is integrated into an attachment structure that can be selectively and removably attached to the portable device when desired. As with FIG. 17, FIG. 18 shows an application in which a wireless power supply 3000 is incorporated into a counter top 3004, table top or other surface. The wireless power supply 3000 may be mounted to the undersurface of the counter top 3004. The attachment structure 3002 is generally separate from the wireless power supply 3000, the counter top 3004 and the portable device 3006; however, it is configured to be removably attached to the portable device 3006 when desired. The attachment structure 3002 may be essentially any structure capable of carrying the resonating circuit and being removably attached to the portable device 3006. For example, the attachment structure 3002 may be a sticker that can be adhesively attached to the portable device (e.g. to the rear of the portable device), a skin than can be fitted over a portion of the portable device, a sleeve that can be frictionally slid onto the portable device, a replace battery cover that can be installed in place of the original battery cover provided with the portable device or a replacement panel that can be installed in place of any removable panel that may have been originally provided with the portable device. With this application, the portable device 3006 may be placed directly on the surface of the counter top 3004 to receive power directly from the wireless power supply 3000. Alternatively, the attachment structure 3002 with integrated resonating circuit can be attached to the portable device 3006 to perpetuate and amplify the electromagnetic field generated by the wireless power supply 3000.

Although not shown, the applications described with reference to FIGS. 17 and 18 may include power indicators and/or enable/disable circuits as described above. The enable/disable circuits may automatically and selectively enable and disable the separate resonating circuit to eliminate any need to remove and/or replace the separate resonating circuit to accommodate different operating conditions.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular. It is to be understood that the invention disclosed and defined herein extends to all alternative combinations of two or more of the individual features mentioned or evident from the text and/or drawings. All of these different combinations constitute various alternative aspects of the present invention.

The embodiments of the invention in which an exclusive property or privilege is claims are defined as follows:

1. An inductive power supply system comprising:
   a primary unit for transmitting wireless power, said primary unit including:
   a primary circuit having a primary for producing a first field; and
   a receiving unit separable from said primary unit and for receiving said wireless power from said primary unit, said receiving unit including:
   two or more secondary resonating circuits configured to receive said wireless power over a range of distances from said primary unit, wherein each of said two or more secondary resonating circuits is configured to receive said wireless power at different distances between said primary unit and said receiving unit;
   wherein one of said two or more secondary resonating circuits is configured for efficient energy transfer over a first portion of said range of distances and another of said two or more secondary resonating circuits is configured for efficient energy transfer over a second portion of said range of distances, wherein said first portion of said range of distances is different from said second portion of said range of distances;
   a secondary circuit for receiving said wireless power by inductively coupling with at least one of (i) said primary circuit and (ii) one of said two or more secondary resonating circuits; and
   wherein said two or more secondary resonating circuits are configured to inductively couple with said secondary circuit to transfer received wireless power to said secondary circuit.

2. The inductive power supply system of claim 1 wherein said two or more secondary resonating circuits are configured to account for an affect on mutual inductance with said primary unit at different locations of said receiving unit with respect to said primary unit.

3. The inductive power supply system of claim 1 wherein said secondary circuit is configured for efficient energy transfer at a first distance and one of said two or more secondary resonating circuits is configured for efficient energy transfer at a second distance, wherein said first distance is different from said second distance.

4. The inductive power supply system of claim 1 wherein each of said two or more secondary resonating circuits includes a resonating coil and a resonating capacitor, and wherein each of said two or more secondary resonating circuits is tuned to a different resonant frequency.

5. The inductive power supply system of claim 1 wherein at least one of said two or more secondary resonating circuits are configured to be selectively activated via a switch for transferring wireless power wirelessly between said primary unit and said receiving unit.

6. The inductive power supply system of claim 1 wherein said primary circuit includes a primary capacitor, wherein said primary circuit is configured to have a resonant frequency.

7. The inductive power supply system of claim 1 wherein at least one of said primary circuit and said two or more resonating circuits includes a variable capacitor capable of changing capacitance in order to achieve a desired tuning and a desired affect on mutual inductance between said primary unit and said receiving unit.

8. The inductive power supply system of claim 1 wherein said primary unit includes a primary resonating circuit having a primary resonator configured to receive power via said first field and configured to produce a second field; wherein said secondary circuit for receiving said wireless power by inductively coupling with said primary resonator.

9. The inductive power supply system of claim 1 wherein said primary resonating circuit is selectively activated via a switch for transferring wireless power between said primary unit and said receiving unit such that (a) said primary resonating circuit transfers wireless power to said receiving unit via said second field in response to said primary resonating circuit being activated and (b) said primary transfers wireless power to said receiving unit via said first field in response to said primary resonating circuit being deactivated.

10. The inductive power supply system of claim 9 wherein said receiving unit is included in a remote device.

11. A remote device for receiving power from an inductive power supply, said remote device comprising:
two or more resonating circuits configured to inductively couple with said inductive power supply, each of said two or more resonating circuits receives power efficiently over a range of different distances between said remote device and said inductive power supply; and
a secondary circuit configured for inductively coupling with at least one of said two or more resonating circuits and said inductive power supply for receiving power wirelessly, said secondary circuit receives power efficiently at a distance less than said range of different distances at which each of said two or more resonating circuits receive power efficiently;
wherein one of said two or more secondary resonating circuits is configured for efficient energy transfer at a first distance portion of said range and another of said two or more secondary resonating circuits configured for efficient energy transfer at a second distance portion of said range, wherein said first distance portion is different from said second distance portion; and
wherein said two or more secondary resonating circuits are configured to inductively coupled with said secondary circuit to transfer received wireless power to said secondary circuit.

12. The remote device of claim 11 wherein overlap exists between said first distance portion of said range and said second distance portion of said range.

13. The remote device of claim 11 wherein said two or more resonating circuits and said secondary circuit are configured to account for an affect on mutual inductance at different locations between said remote device and said inductive power supply.

14. The remote device of claim 11 wherein at least one of said two or more resonating circuits are configured to be selectively activated via an associated switch for transferring power wirelessly between said inductive power supply and said remote device such that said at least one of said two or more resonating circuits receives power wirelessly from said inductive power supply in response to being activated.

15. The remote device of claim 11 wherein at least one of said two or more resonating circuits includes a variable capacitor capable of changing capacitance in order to achieve a desired tuning and a desired affect on mutual inductance between said remote device and said inductive power supply.

16. The remote device of claim 11
including an additional secondary resonating circuit configured for efficient energy transfer over a third distance portion of said range, and wherein overlap exists between at least two of said first distance portion of said range, said second distance portion of said range, and said third distance portion of said range.

* * * * *